United States Patent
Hirose et al.

(10) Patent No.: US 12,085,728 B2
(45) Date of Patent: Sep. 10, 2024

(54) OPTICAL DEVICE AND ELECTRONIC DEVICE

(71) Applicant: SEMICONDUCTOR ENERGY LABORATORY CO., LTD., Atsugi (JP)

(72) Inventors: Takeya Hirose, Kanagawa (JP); Ryo Hatsumi, Kanagawa (JP); Hisao Ikeda, Kanagawa (JP); Daiki Nakamura, Kanagawa (JP); Yosuke Tsukamoto, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 18/182,604

(22) Filed: Mar. 13, 2023

(65) Prior Publication Data
US 2023/0296910 A1 Sep. 21, 2023

(30) Foreign Application Priority Data

Mar. 18, 2022 (JP) ................................ 2022-043298

(51) Int. Cl.
G02B 27/28 (2006.01)
G02B 27/14 (2006.01)
(52) U.S. Cl.
CPC ......... *G02B 27/286* (2013.01); *G02B 27/144* (2013.01)
(58) Field of Classification Search
CPC ............................ G02B 27/286; G02B 27/144
USPC ......................................................... 349/13
See application file for complete search history.

(56) References Cited

U.S. PATENT DOCUMENTS

| | | | |
|---|---|---|---|
| 7,399,991 B2 | 7/2008 | Seo et al. | |
| 7,663,149 B2 | 2/2010 | Seo et al. | |
| 8,299,553 B2 | 10/2012 | Kawakami et al. | |
| 10,297,649 B2 | 5/2019 | Hirakata | |
| 2021/0318480 A1* | 10/2021 | Hong | G03H 1/2294 |
| 2023/0014360 A1 | 1/2023 | Kimura et al. | |

FOREIGN PATENT DOCUMENTS

| | | | | |
|---|---|---|---|---|
| CN | 110383135 A | * | 10/2019 | ......... G02B 17/0804 |
| JP | 2002-324673 A | | 11/2002 | |
| KR | 20190116193 A | * | 10/2019 | |

OTHER PUBLICATIONS

An Introduction To Polarization Directed Flat Lenses, https://www.edmundoptics.eu/knowledge-center/trending-in-optics/polarization-directed-flat-lenses, Nov. 1, 2016.

\* cited by examiner

*Primary Examiner* — Michael H Caley
*Assistant Examiner* — William D Peterson
(74) *Attorney, Agent, or Firm* — Fish & Richardson P.C.

(57) ABSTRACT

An optical device with less influence of stray light is provided. The optical device is thin and includes a half mirror, a first lens, a retardation plate, a reflective polarizing plate, and a second lens. In the optical device, a geometric phase lens which has negative and positive refractive power is used as the first lens, whereby images can be focused after magnified optically. Thus, the optical device can have a wide viewing angle. In the case where stray light occurs due to birefringence of an optical material, negative refractive power of the first lens can prevent the stray light from being focused on the eye direction. Accordingly, image degradation recognized due to stray light can be prevented.

12 Claims, 23 Drawing Sheets

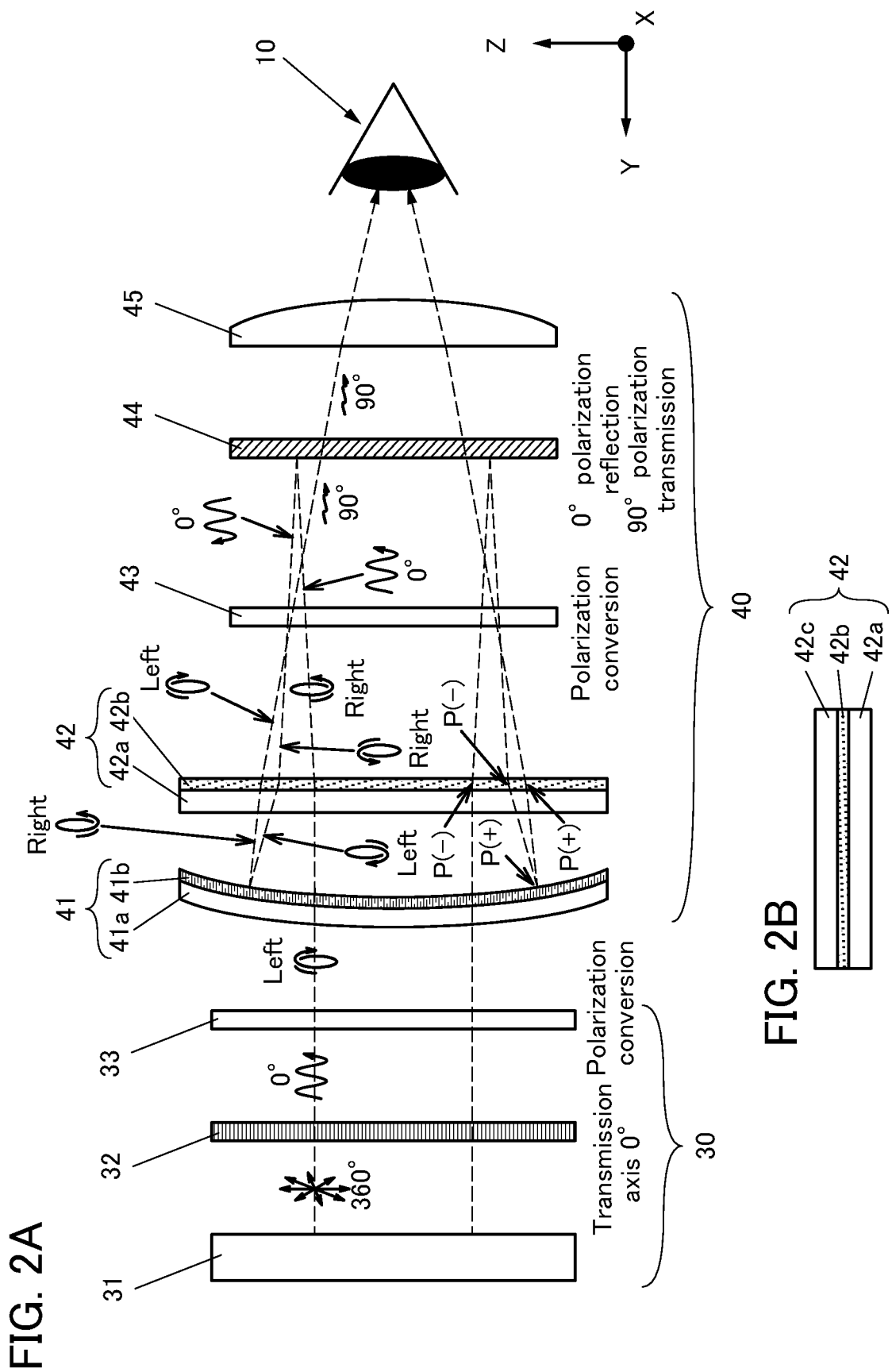

OPTICAL DEVICE AND ELECTRONIC DEVICE

BACKGROUND OF THE INVENTION

1. Field of the Invention

One embodiment of the present invention relates to an optical device and an electronic device.

Note that one embodiment of the present invention is not limited to the above technical field. The technical field of one embodiment of the invention disclosed in this specification and the like relates to an object, a method, or a manufacturing method. One embodiment of the present invention relates to a process, a machine, manufacture, or a composition of matter. Specifically, examples of the technical field of one embodiment of the present invention disclosed in this specification include a semiconductor device, a display device, a liquid crystal display device, a light-emitting device, a lighting device, a power storage device, a memory device, an imaging device, a method for operating any of them, and a method for manufacturing any of them.

In this specification and the like, a semiconductor device generally means a device that can function by utilizing semiconductor characteristics. A transistor and a semiconductor circuit are embodiments of semiconductor devices. In some cases, a memory device, a display device, an imaging device, or an electronic device includes a semiconductor device.

2. Description of the Related Art

Goggle-type devices and glasses-type devices have been developed as electronic devices for virtual reality (VR), augmented reality (AR), and the like.

Typical examples of display devices that can be used for display panels include a display device including a liquid crystal element and a display device including an organic electroluminescent (EL) device, a light-emitting diode (LED), or the like.

A display device including an organic EL device does not need a backlight, which is necessary for a liquid crystal display device, and thus can have advantages such as thinness, lightweight, high contrast, and low power consumption. For example, Patent Document 1 discloses an example of a display device including an organic EL device.

REFERENCE

[Patent Document 1] Japanese Published Patent Application No. 2002-324673

SUMMARY OF THE INVENTION

Electronic devices used for VR, AR, and the like are a kind of wearable device, and desired to be thin and lightweight in order to improve their portability and ease of wearing. For this reason, thin optical devices are used in such electronic devices.

A thin optical device includes an optical system that ensures an optical path length by repeating transmission and reflection of polarized light in the optical device. As a lens used for the optical system, a glass lens is preferably used in terms of optical characteristics, and a resin lens is preferably used in terms of weight reduction.

However, the resin lens has optical anisotropy due to molecular orientation and the like, and birefringence might disrupt the state of polarization. Therefore, reflection or transmission of light does not work properly in some components in the optical system, which might generate light that deviates from the normal optical path (stray light). This stray light forms an image on the retina in a different position from the normal optical path, and thus becomes a factor of display quality degradation such as double images.

Furthermore, the electronic devices used for VR, AR, and the like are required to have a wide field of view (FOV). A wide viewing angle makes a user feel sense of immersion and a realistic sensation more easily.

In view of the above, an object of one embodiment of the present invention is to provide an optical device with less influence of stray light. Another object is to provide a thin and lightweight optical device. Another object is to provide an optical device capable of enhancing the display quality. Another object is to provide an optical device capable of increasing the viewing angle. Another object is to provide a small-sized electronic device including the optical device. Another object is to provide an electronic device with low power consumption. Another object is to provide a novel electronic device.

Note that the description of these objects does not preclude the existence of other objects. In one embodiment of the present invention, there is no need to achieve all these objects. Other objects will be apparent from and can be derived from the description of the specification, the drawings, the claims, and the like.

One embodiment of the present invention relates to a thin and lightweight optical device with less stray light. Furthermore, one embodiment of the present invention relates to an electronic device including the optical device.

One embodiment of the present invention is an optical device including a half mirror, a first lens, a retardation plate, a reflective polarizing plate, and a second lens. The half mirror, the first lens, the retardation plate, the reflective polarizing plate, and the second lens are placed in this order to have an overlapping region. The first lens is a geometric phase lens. The first lens has negative refractive power with respect to circularly polarized light that passes through the half mirror and enters the first lens.

The first lens includes a liquid crystal layer. The rotation direction of circularly polarized light that enters the first lens can be inverted by birefringence of the liquid crystal layer and then the circularly polarized light can be emitted.

The first lens has one of negative refractive power and positive refractive power with respect to circularly polarized light that enters from a first surface of the liquid crystal layer. The first lens has the other of the negative refractive power and the positive refractive power with respect to circularly polarized light that enters from a second surface. The second surface is opposite to the first surface.

It is preferable that the half mirror include a concave surface on the first lens side and a reflection surface be provided on the concave surface. The half mirror may have a shape of a concave lens.

A quarter-wave plate can be used as the retardation plate.

The reflective polarizing plate can reflect first linearly polarized light, and transmit second linearly polarized light that is orthogonal to the first linearly polarized light.

The second lens can be a convex lens.

A circular polarizing plate may be provided on a surface of the half mirror opposite to a surface of the half mirror on which the first lens is provided.

Another embodiment of the present invention is an electronic device including a housing, two sets of a display device and the optical device in the housing, and a band for mounting the housing on a head. The display device preferably includes an organic EL device.

One embodiment of the present invention can provide an optical device with less influence of stray light. A thin and lightweight optical device can be provided. An optical device capable of enhancing the display quality can be provided. An optical device capable of increasing the viewing angle can be provided. A small-sized electronic device including the optical device can be provided. An electronic device with low power consumption can be provided. A novel electronic device can be provided.

Note that the description of these effects does not preclude the existence of other effects. One embodiment of the present invention does not necessarily have all of these effects. Other effects can be derived from the description of the specification, the drawings, and the claims.

BRIEF DESCRIPTION OF THE DRAWINGS

FIGS. 2A and 2B each illustrate an optical device.

DETAILED DESCRIPTION OF THE INVENTION

Figure 1:
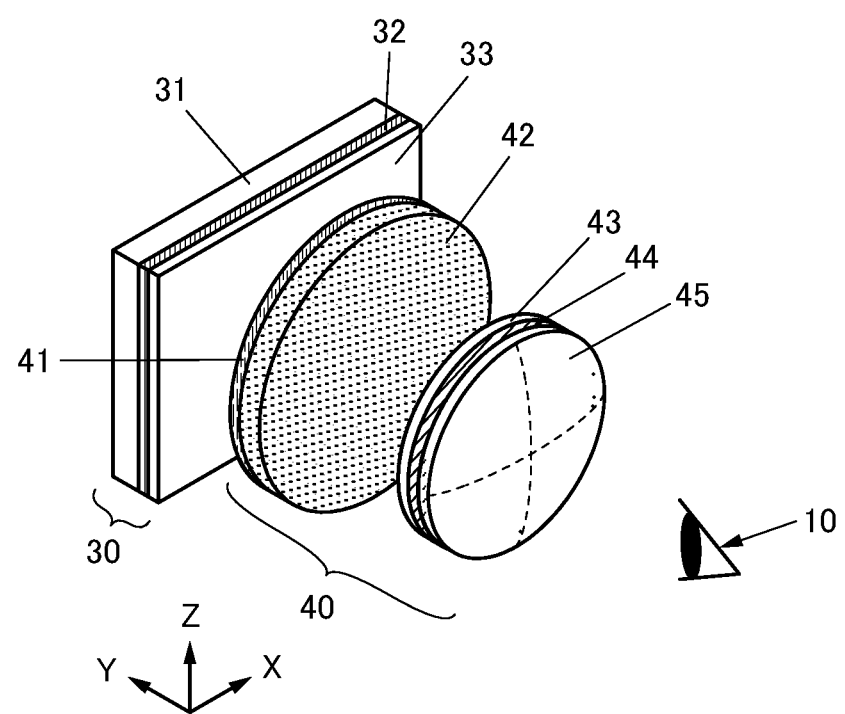
FIG. 1 illustrates a display device and an optical device.

Embodiments will be described in detail with reference to the drawings. Note that the present invention is not limited to the following description, and it will be easily understood by those skilled in the art that various changes and modifications can be made without departing from the spirit and scope of the present invention. Therefore, the present invention should not be interpreted as being limited to the description of embodiments below. Note that in structures of the invention described below, the same portions or portions having similar functions are denoted by the same reference numerals in different drawings, and the description thereof is not repeated in some cases. The same components are denoted by different hatching patterns in different drawings, or the hatching patterns are omitted in some cases.

Even in the case where a single component is illustrated in a circuit diagram, the component may be composed of a plurality of parts as long as there is no functional inconvenience. For example, in some cases, a plurality of transistors that operate as a switch are connected in series or in parallel. In some cases, capacitors are divided and arranged in a plurality of positions.

One conductor has a plurality of functions such as a wiring, an electrode, and a terminal in some cases. In this specification, a plurality of names are used for the same component in some cases. Even in the case where elements are illustrated in a circuit diagram as if they are directly connected to each other, the elements may actually be connected to each other through two or more conductors. In this specification, even such a configuration is included in direct connection.

Embodiment 1

In this embodiment, an optical device and an electronic device of embodiments of the present invention will be described.

One embodiment of the present invention is a thin optical device including a half mirror, a first lens, a retardation plate, a reflective polarizing plate, and a second lens. In the optical device, a geometric phase lens which can exert negative or positive refractive power is used as the first lens, whereby images can be focused after magnified optically. Thus, the optical device can have a wide viewing angle.

In the case where stray light occurs due to birefringence of an optical material, negative refractive power of the first lens can prevent the stray light from being focused on the eye direction. Accordingly, image degradation recognized due to stray light can be prevented. A thin optical element such as a liquid crystal lens can be used as the geometric phase lens, in which case the optical device can be thin and lightweight.

An electronic device such as a goggle-type device or a glasses-type device has a combined structure of a display device and an optical device in order to widen the viewing angle. With the use of the optical device of one embodiment of the present invention for the electronic device, the electronic device can be compact and thin and have high display quality and high reliability.

Note that the optical device of one embodiment of the present invention has a combined structure of a plurality of optical components. A mechanism in which such a structure is included in a housing is simply called a lens. It is also called a pancake lens in some cases because of its thin shape.

FIG. 1 is a perspective view illustrating a display device and an optical device which can be used for the electronic device of one embodiment of the present invention. As illustrated in FIG. 1, a display device 30 and an optical device 40 are placed to be apart from each other to have an overlapping region.

A user can see an image displayed on the display device 30 when bringing an eye 10 near the optical device 40. The user recognizes the image while the viewing angle is widened by the optical device 40, and thus can obtain sense of immersion and a realistic sensation.

The display device 30 has a structure in which a display panel 31, a linear polarizing plate 32, and a retardation plate 33 have an overlapping region. Note that a first surface in the following description refers to a surface of a component, and a second surface refers to a surface opposite to the first surface.

For example, as illustrated in FIG. 1, a first surface of the linear polarizing plate 32 can be close to a display surface of the display panel 31 and a second surface of the linear polarizing plate 32 can be close to a first surface of the retardation plate 33. Note that the combination of the linear polarizing plate 32 and the retardation plate 33 is also referred to as a circular polarizing plate that converts unpolarized light to circularly polarized light.

Note that the linear polarizing plate 32 and the retardation plate 33 are not necessarily components of the display device 30, and may be provided between the display device 30 (the display panel 31) and the optical device 40. Alternatively, the linear polarizing plate 32 and the retardation plate 33 may be provided on the light incident surface side of the optical device 40 (the light incident surface side of a half mirror 41) as components of the optical device 40. Alternatively, the linear polarizing plate 32 may be a component of the display device 30 and the retardation plate 33 may be a component of the optical device 40.

The optical device 40 has a region where the half mirror 41, a lens 42, a retardation plate 43, a reflective polarizing plate 44, and a lens 45 overlap with one another.

For example, as illustrated in FIG. 1, a first surface of the half mirror 41 can be close to a first surface of the lens 42. Furthermore, a first surface of the reflective polarizing plate 44 can be close to a first surface of the retardation plate 43, and a first surface of the lens 45 can be close to a second surface of the reflective polarizing plate 44.

The half mirror 41 and the lens 42 may be placed to be apart from each other in order that a necessary optical path length can be ensured. FIG. 1 illustrates a structure example in which the lens 42 and the retardation plate 43 are placed to be apart from each other; however, the lens 42 and the retardation plate 43 may be placed to be close to each other.

In the case where a structure in which one component and another component are close to each other is employed, the components are preferably bonded to each other with the use of an optical adhesive which has high transmittance of light with a used wavelength (e.g., the wavelength range of visible light or the wavelength range from blue light to red light) and which does not cause birefringence and absorption of particular polarized light. Alternatively, the another component may be formed on and in contact with the one component by a coating method, not by bonding. Alternatively, without using an adhesive or the like between the one component and the another component, the components may be placed in contact with each other. Alternatively, a space may be provided between the one component and the another component.

FIG. 2A illustrates part of an optical path in the optical device of one embodiment of the present invention, and the optical path is shown by a dashed line. For simplicity, some components close to each other in FIG. 1 are apart from each other in FIG. 2A. Note that the effect of one embodiment of the present invention can be obtained also by arranging the components separately as in FIG. 2A.

Part of light emitted from the display panel 31 passes through the linear polarizing plate 32, the retardation plate 33, the half mirror 41, the lens 42, and the retardation plate 43, and is reflected by the reflective polarizing plate 44. The light reflected by the reflective polarizing plate 44 passes through the retardation plate 43 and the lens 42, and is reflected again by the half mirror 41. The light reflected by the half mirror 41 passes through the lens 42, the retardation plate 43, the reflective polarizing plate 44, and the lens 45, and enters the eye 10.

Reflection is repeated in the optical device 40 in this manner, so that the optical path length can be ensured, whereby an optical system with a short focal length can be achieved.

As the display panel 31, a liquid crystal panel including a liquid crystal element, an organic EL panel including an organic EL device, an LED panel including a micro LED, or the like can be used. In particular, an organic EL panel is preferably used because a self-luminous and high-resolution display portion is easily formed.

The linear polarizing plate 32 can extract one linearly polarized light from light oscillating in 360° all directions. Note that although description is given in this embodiment under the assumption that the transmission axis of the linear polarizing plate 32 is 0°, 0° is not an absolute value, but a reference value. That is, the polarization plane of the linearly polarized light extracted by the linear polarizing plate 32 is regarded as 0°. Accordingly, for example, 90° linearly polarized light in this embodiment refers to linearly polarized light obtained by rotating the polarization plane of the linearly polarized light extracted by the linear polarizing plate 32 by 90°.

The retardation plate 33 has a function of converting linearly polarized light to circularly polarized light. Here, a $\lambda/4$ plate (a quarter-wave plate) is used as the retardation plate 33. The $\lambda/4$ plate is overlaid with the linear polarizing plate 32 such that the angle of the slow axis of the $\lambda/4$ plate with respect to the axis of the linearly polarized light extracted by the linear polarizing plate 32 becomes 45°, whereby a right-handed circularly polarized light (right circularly polarized light) is obtained. The $\lambda/4$ plate is overlaid with the linear polarizing plate 32 such that the angle of the slow axis of the $\lambda/4$ plate with respect to the axis of the linearly polarized light extracted by the linear polarizing plate 32 becomes −45°, whereby a left-handed circularly polarized light (left circularly polarized light) is obtained. In one embodiment of the present invention, either right circularly polarized light or left circularly polarized light can be used as long as combination with the lens 42, which is described later, is appropriate.

In the half mirror 41, for example, optical glass or an optical resin which have high visible light transmittance can be used for a substrate 41a, and a surface provided with a metal film or a dielectric film can be used as a reflection surface 41b. Each of the visible light transmittance and the visible light reflectance of the half mirror 41 can be, for example, approximately 50%.

The reflection surface 41b of the half mirror 41 preferably has positive refractive power in order to focus light in the direction of the eye 10. For this reason, it is preferable that the substrate 41a have a concave surface and the reflection surface 41b be formed on the concave surface.

Note that FIG. 2A illustrates an example in which a first surface of the substrate 41a is a convex surface, a second surface thereof is a concave surface, and the first surface and the second surface have the same curvature radius. In that case, the substrate 41a does not function as a lens. For this reason, although FIG. 2A illustrates an example in which the reflection surface 41b is provided on the second surface, the reflection surface 41b may be provided on the first surface.

Note that when a component of the optical device 40 other than the half mirror 41 can focus light in the direction of the eye 10, the substrate 41a may have a flat surface and the reflection surface 41b may be provided on the flat surface.

In one embodiment of the present invention, the lens 42 exerts negative refractive power with respect to light passing through the half mirror 41, whereby light is emitted in the dispersion direction. Thus, the substrate 41*a* of the half mirror 41 may have negative refractive power and a concave lens shape, so that the negative refractive power is increased by the half mirror 41 and the lens 42. The increase in negative refractive power can foster enlargement of an image on the display panel 31, so that the viewing angle can be increased. In addition, although details will be described later, the amount of stray light that travels in the direction of the eye 10 can be reduced.

Figure 3A:
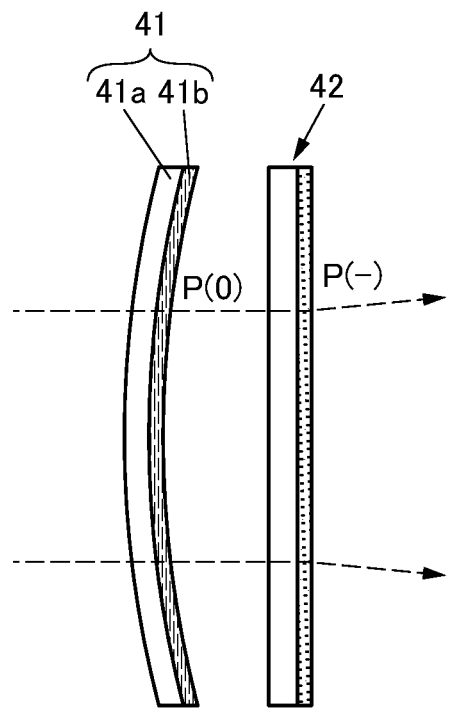
FIGS. 3A to 3D each illustrate a half mirror.

FIGS. 3A to 3D illustrate modification examples of the substrate 41*a* that can be used for the half mirror 41. FIG. 3A illustrates an example in which, as in FIG. 2A, the substrate 41*a* has a shape with which the substrate 41*a* does not function as a lens. The refractive power that exerts on light passing through the half mirror 41 is 0 (P(0)), and the light traveling direction is not changed by the half mirror 41. Note that the negative refractive power (P(−)) of the lens 42 can make light travel in the dispersion direction.

Figure 3B:
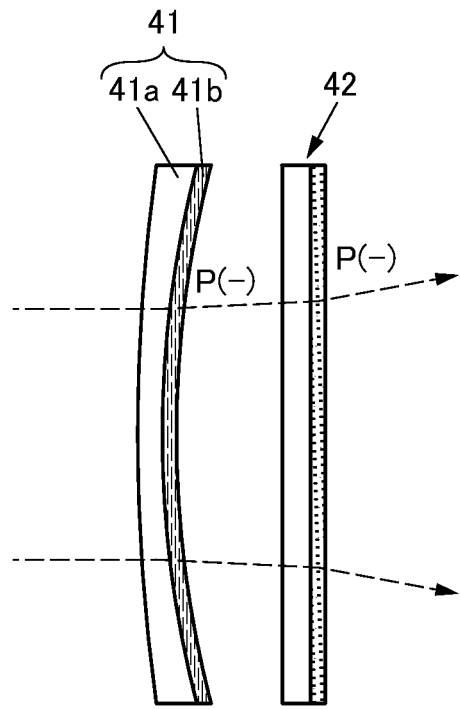

FIG. 3B illustrates an example in which the substrate 41*a* has a shape of a concave meniscus lens. A concave meniscus lens has negative refractive power (P(−)) with respect to light passing through the lens. Therefore, light from the lens 42 can be made travel in the dispersion direction more strongly than that in FIG. 3A.

Figure 3C:
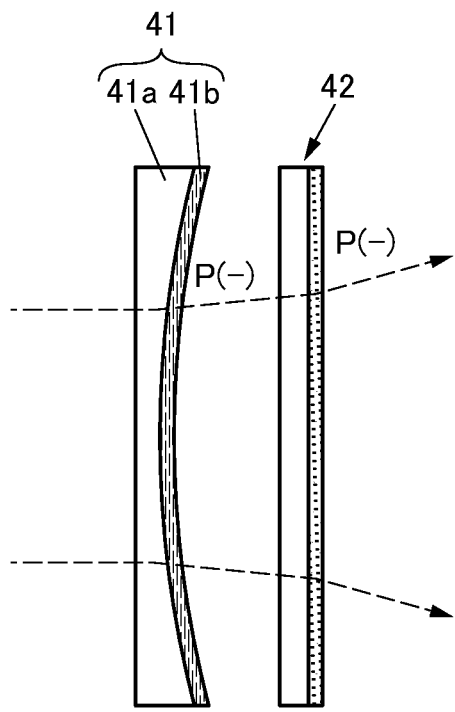

FIG. 3C illustrates an example in which the substrate 41*a* has a shape of a plano-concave lens. When the plano-concave lens and the concave meniscus lens in FIG. 3B have the same curvature radius of the concave surface, the plano-concave lens has higher negative refractive power (P(−)) than the concave meniscus lens in FIG. 3B. Therefore, light from the lens 42 can be made travel in the dispersion direction more strongly than that in FIG. 3B.

Figure 3D:
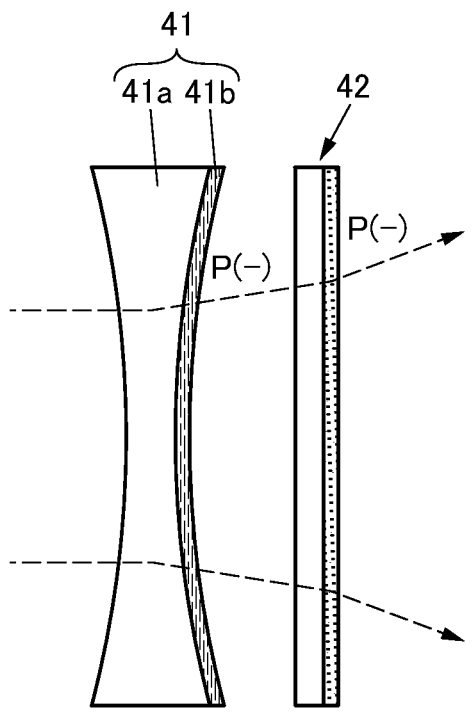

FIG. 3D illustrates an example in which the substrate 41*a* has a shape of a biconcave lens. When the biconcave lens and the plano-concave lens in FIG. 3C have the same curvature radius of the concave surface, the biconcave lens has higher negative refractive power (P(−)) than the plano-concave lens in FIG. 3C. Therefore, light from the lens 42 can be made travel in the dispersion direction more strongly than that in FIG. 3C.

Note that in one embodiment of the present invention, light passing through the half mirror 41 and the lens 42 preferably travels in the dispersion direction; however, the light needs to be focused finally in the direction of the eye 10 as illustrated in FIG. 2A. Accordingly, the structures of the substrate 41*a* illustrated in FIGS. 3A to 3D can be selected as appropriate in order that an appropriate optical path can be obtained.

A geometric phase lens can be used as the lens 42. The geometric phase lens has a structure in which materials having optical anisotropy are arranged as appropriate in two dimensions or three dimensions, and can provide a lens effect by generating a spatially geometric phase shift. A Pancharatnam-Berry phase lens is known as a typical example of the geometric phase lens.

The lens 42 can include a substrate 42*a* and an optical conversion layer 42*b* provided on the substrate 42*a*. Note that although FIG. 2A illustrates a two-layer structure of the substrate 42*a* and the optical conversion layer 42*b*, a three-layer structure of the substrate 42*a*, the optical conversion layer 42*b*, and a substrate 42*c* illustrated in FIG. 2B may be employed. Each of the substrate 42*a* and the substrate 42*c* is not limited to a single layer, and can be formed of a plurality of layers. One of the substrates 42*a* and 42*c* can be referred to as a protective layer. The substrates 42*a* and 42*c* are preferably formed with a material with high visible light transmittance and less birefringence.

Figure 4A:
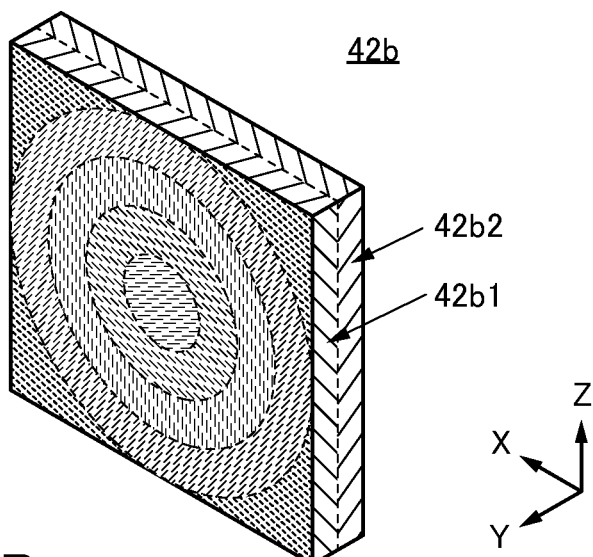
FIGS. 4A to 4D each illustrate a geometric phase lens.

The optical conversion layer 42*b* can have a stacked structure of a layer 42*b*1 and a layer 42*b*2 as illustrated in FIG. 4A, for example. In each of the layer 42*b*1 and the layer 42*b*2, materials having optical anisotropy are regularly arranged on a plane. The layer 42*b*1 and the layer 42*b*2 are plane-symmetrical to each other at their boundary.

For example, liquid crystal can be used as the material having optical anisotropy. The optical conversion layer 42*b* can be formed by stacking a first liquid crystal layer (the layer 42*b*1) and a second liquid crystal layer (the layer 42*b*2) that is plane-symmetric to the first liquid crystal layer. In the first liquid crystal layer, liquid crystals with different orientation twist directions are regularly arranged on a plane. For example, an optical alignment technique can be used for regularly arranging the liquid crystals on a plane. Note that the optical conversion layer 42*b* can be formed using a single liquid crystal layer or metasurface technology.

Figure 4B:
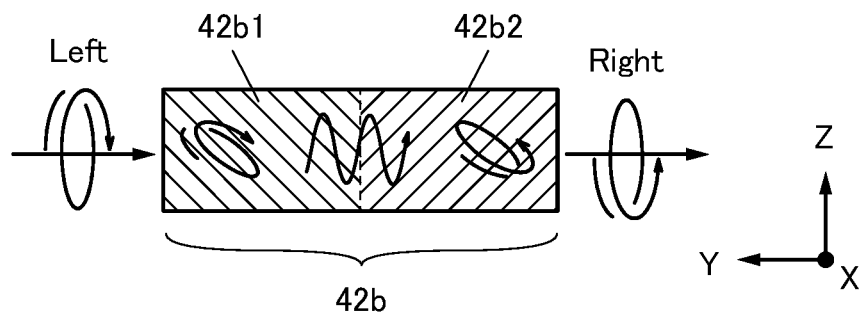

The layer 42*b*1 and the layer 42*b*2 have optical anisotropy due to birefringence and have a function of reversibly converting linearly polarized light and circularly polarized light. For example, as illustrated in FIG. 4B, left circularly polarized light is incident from the layer 42*b*1 side and converted to linearly polarized light, and then in the layer 42*b*2 that is plane-symmetric to the layer 42*b*1, the linearly polarized light is converted to right circularly polarized light and emitted. In the case where right circularly polarized light is incident on the optical conversion layer 42*b*, the light is converted to left circularly polarized light and emitted. Also in the case where circularly polarized light is incident from the layer 42*b*2 side, the rotation direction is converted and then light obtained by converting its rotation direction is emitted. That is, in the optical conversion layer 42*b*, incident circularly polarized light can be inverted and emitted.

Since the materials having optical anisotropy are regularly arranged on a plane in the optical conversion layer 42*b*, the optical conversion layer 42*b* can cause a phase shift of light and vary the levels of the phase shifts depending on regions. Thus, refraction of light according to Huygens' principle can be changed depending on the regions; accordingly, the optical conversion layer 42*b* can function as a lens.

Figure 4C:
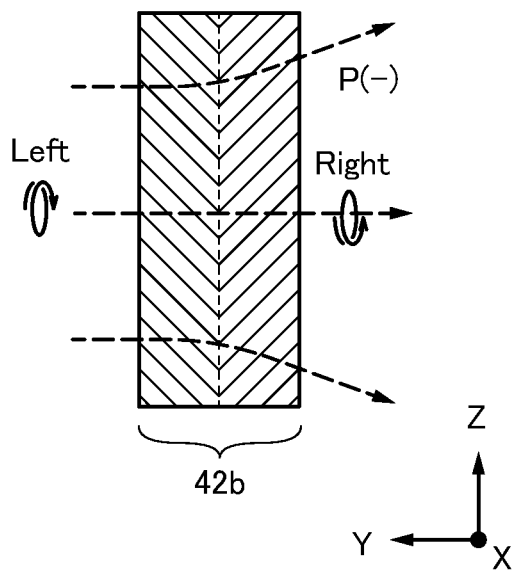
Figure 4D:
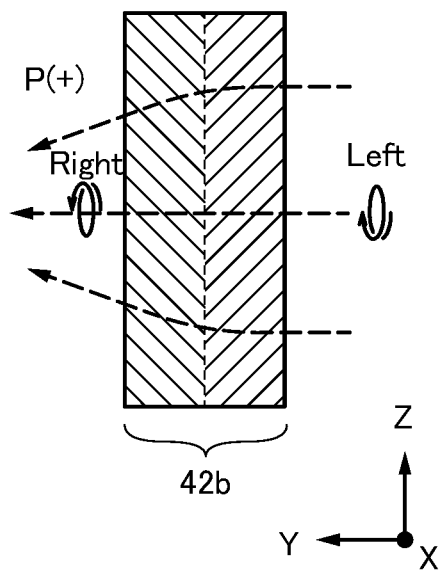

Behavior of the phase shifts can be made different depending on the polarization state. For example, as illustrated in FIG. 4C, circularly polarized light that is incident from one surface of the optical conversion layer 42*b* can be subjected to the negative refractive power (P(−)) and then dispersed. As illustrated in FIG. 4D, circularly polarized light that is incident from the other surface of the optical conversion layer 42*b* can be subjected to the positive refractive power (P(+)) and then focused. The above-described dispersion and focus can be inverted by changing the arrangement of the materials having optical anisotropy.

Figure 5A:
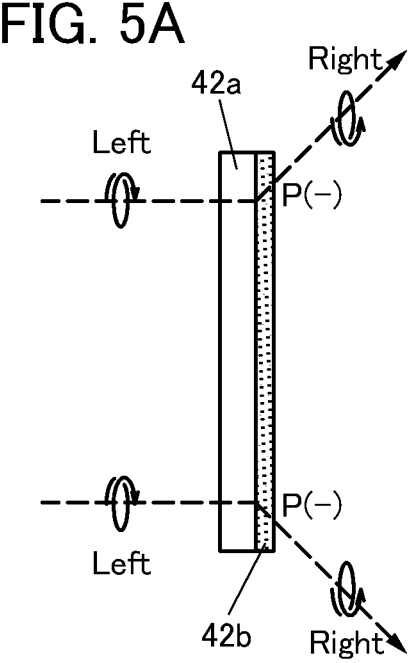
FIGS. 5A to 5D each illustrate a geometric phase lens.
Figure 5B:
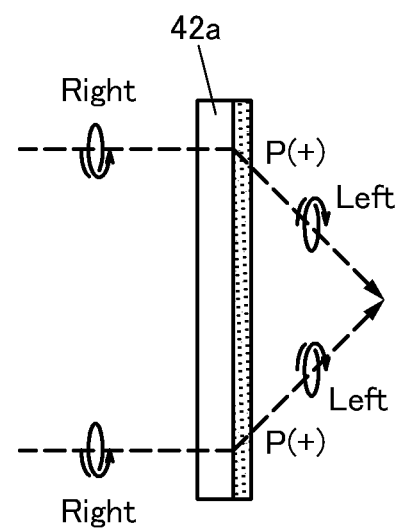
Figure 5C:
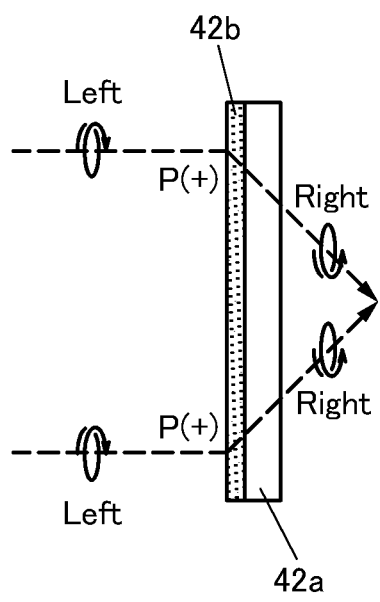

Note that the optical conversion layer 42*b* illustrated in FIG. 2A has the following characteristics. When left circularly polarized light is incident from the substrate 42*a* side, the light is converted to right circularly polarized light, subjected to the negative refractive power (P(−)), and dispersed (see FIG. 5A). When right circularly polarized light is incident from the substrate 42*a* side, the light is converted to left circularly polarized light, subjected to the positive refractive power (P(+)), and focused (see FIG. 5B). When left circularly polarized light is incident from the optical conversion layer 42*b* side, the light is converted to right circular circularly polarized light, subjected to the positive refractive power (P(+)), and focused (see FIG. 5C). When right circularly polarized light is incident from the optical conversion layer 42*b* side, the light is converted to left circularly polarized light, subjected to the negative refractive power (P(−)), and dispersed (see FIG. 5D).

The retardation plate 43 has a function of reversibly converting linearly polarized light and circularly polarized light. As well as the retardation plate 33, the retardation plate 43 can be a λ/4 plate (a quarter-wave plate).

The reflective polarizing plate 44 can transmit linearly polarized light whose oscillation direction is coincide with the transmission axis of the reflective polarizing plate 44, and can reflect linearly polarized light whose oscillation direction is orthogonal to the transmission axis. For example, a wire grid polarizing plate or a dielectric multi-layer film can be used as the reflective polarizing plate.

A convex lens can be used as the lens 45. FIG. 2A illustrates an example in which a plano-convex lens is used as the lens 45, but the lens 45 is not limited to this example. For example, the lens 45 may be formed of a plurality of plano-convex lenses. Alternatively, a biconvex lens may be used as the lens 45. Alternatively, the lens 45 can be formed by combining lenses selected from a biconvex lens, a plano-convex lens, a biconcave lens, a plano-concave lens, a convex meniscus lens, and a concave meniscus lens. The lens 45 is not limited to a spherical lens, and may be an aspheric lens. The optical device 40 may be provided with a lens other than the lenses 42 and 45.

Details of the polarization state in the above-described optical device 40 are described with reference to an optical path in the upper side in FIG. 2A. In addition, refractive power of some components is shown in an optical path on the lower side of FIG. 2A.

Light oscillating 360° all directions that is emitted from the display panel 31 enters the linear polarizing plate 32. The transmission axis of the linear polarizing plate 32 is 0°, and 0° linearly polarized light is extracted by the linear polarizing plate 32.

The 0° linearly polarized light that is extracted by the linear polarizing plate 32 is converted to left circularly polarized light by the retardation plate 33. The left circularly polarized light converted by the retardation plate 33 passes through the half mirror 41 and enters the lens 42, and is converted to right circularly polarized light (see FIG. 5A).

The right circularly polarized light that is emitted in the dispersion direction due to the negative refractive power (P(−)) of the lens 42 enters the retardation plate 43, and is converted to 0° linearly polarized light. The 0° linearly polarized light from the retardation plate 43 is reflected by the reflective polarizing plate 44 whose reflection axis is 0°, and the light enters the retardation plate 43 and is converted to right circularly polarized light.

Figure 5D:
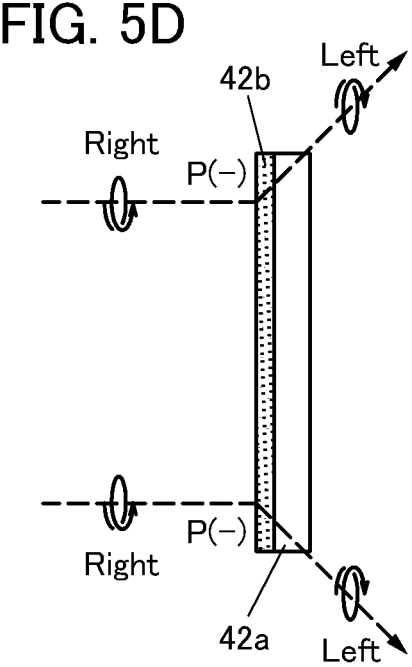

The right circularly polarized light from the retardation plate 43 is converted to left circularly polarized light by the lens 42 (see FIG. 5D). The left circularly polarized light that is emitted in the dispersion direction due to the negative refractive power (P(−)) of the lens 42 is reflected by the half mirror 41 and inverted to right circularly polarized light. The right circularly polarized light that is inverted by the half mirror 41 is subjected to the positive refractive power (P(+)) and enters the lens 42, and is converted to left circularly polarized light. Then, the light is emitted in the focusing direction due to the positive refractive power (P(+)) of the lens 42 (see FIG. 5B).

The left circularly polarized light from the lens 42 enters the retardation plate 43, and is converted to 90° linearly polarized light. The 90° linearly polarized light from the retardation plate 43 passes through the reflective polarizing plate 44 whose transmission axis is 90° and the lens 45, and enters the eye 10.

As described above, reflection and transmission can be selectively performed utilizing linearly polarized light, circularly polarized light, the half mirror, and the reflective polarizing plate. Therefore, the optical path length can be ensured in a limited space, whereby the focal length of the optical device can be shortened. In addition, since images can be focused after magnified optically by the lens 42, the optical device can have a wide viewing angle.

In the above description, left circularly polarized light is used as the light that passes through the half mirror 41 and enters the lens 42, but right circularly polarized light may be used. In that case, the lens 42 is placed such that the light passing through the half mirror 41 is incident from the optical conversion layer 42b side (see FIG. 5D).

Furthermore, in the above description, light dispersion and focusing are described using an example in which the rotation direction of circularly polarized light is inverted by the optical conversion layer 42b of the lens 42; similarly, light dispersion and focusing can be performed also in the case where the rotation direction of the circularly polarized light is not inverted.

Figure 6A:
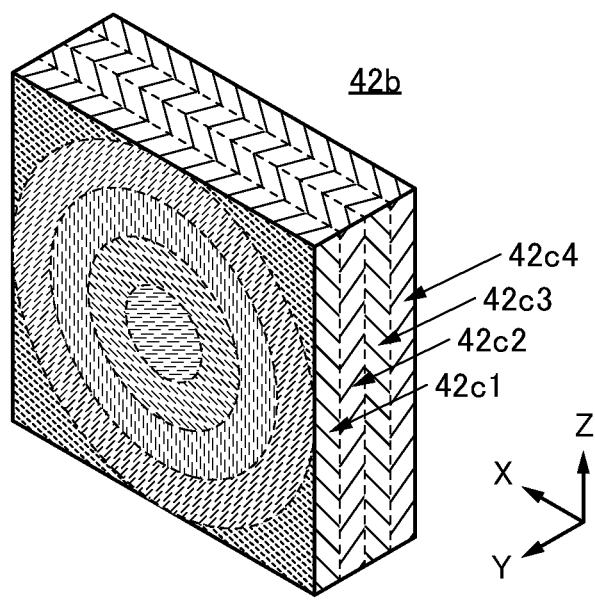
FIGS. 6A and 6B each illustrate a geometric phase lens.

For example, as illustrated in FIG. 6A, the case where the optical conversion layer 42b has a four-layer structure of a layer 42c1, a layer 42c2, a layer 42c3, and a layer 42c4 is considered. Here, the layer 42c1 and the layer 42c3 each correspond to the layer 42b1 in FIG. 4A, and the layer 42c2 and the layer 42c4 each correspond to the layer 42b2 in FIG. 4A. That is, the optical conversion layer 42b in FIG. 6A has a structure in which two optical conversion layers 42b illustrated in FIG. 4A are stacked.

Figure 6B:
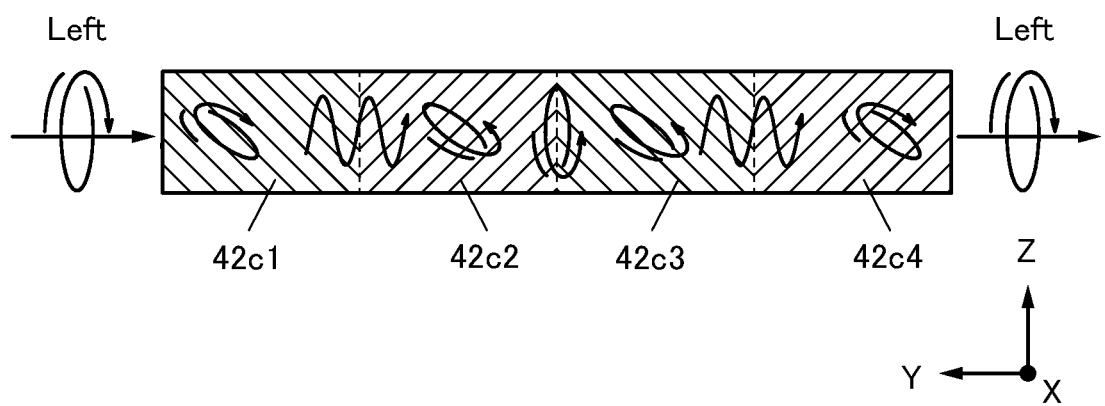

With such a structure, the rotation direction of the circularly polarized light is inverted twice as illustrated in FIG. 6B, so that the circularly polarized light having the same rotation direction as the incident circularly polarized light is emitted. Furthermore, the following behavior of the phase shift can be achieved as in FIGS. 4C and 4D by arranging materials having optical anisotropy as appropriate: light is dispersed when the light is incident from one surface and focused when the light is incident from the other surface.

Figure 7:
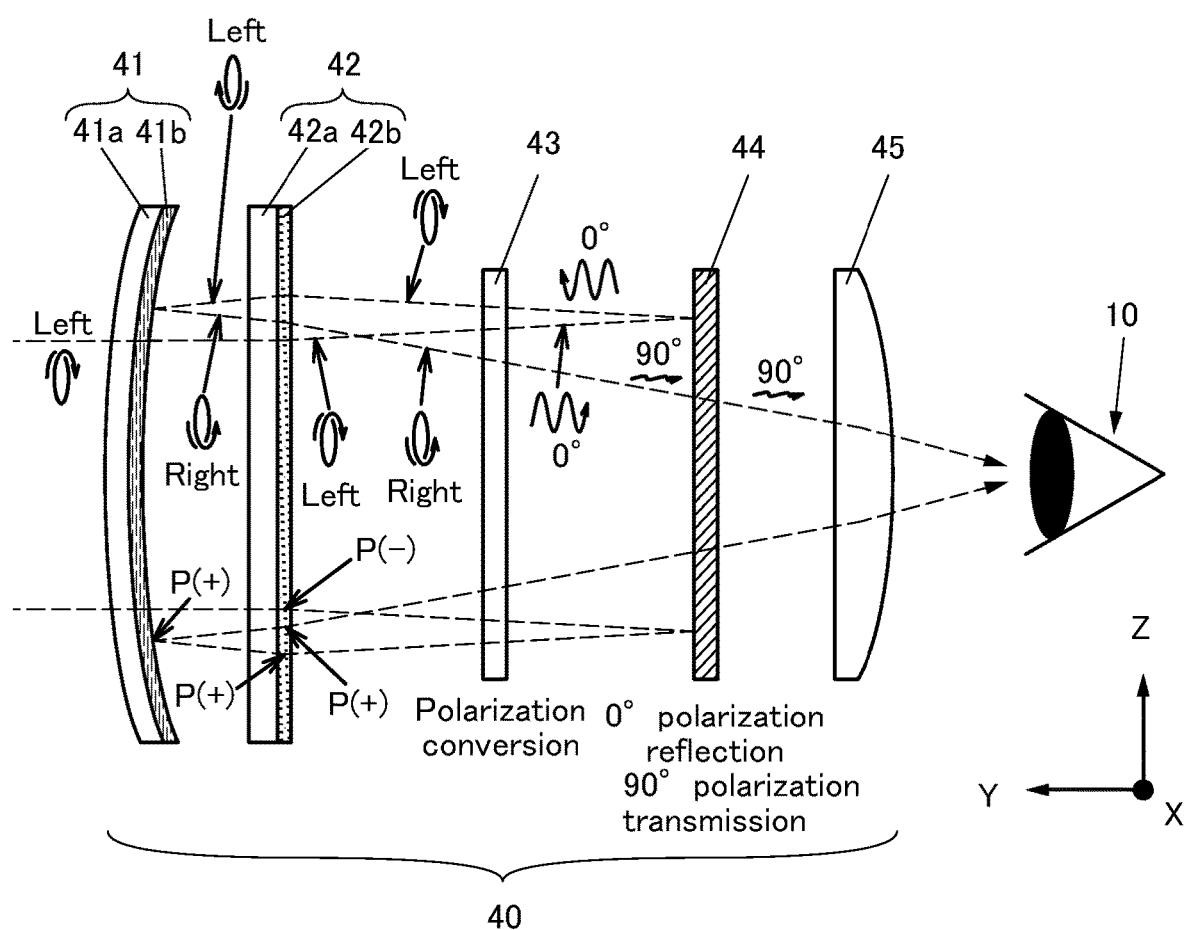
FIG. 7 illustrates an optical device.

Details of the polarization state in the optical device 40 including the optical conversion layer 42b illustrated in FIGS. 6A and 6B are described with reference to an optical path on the upper side of FIG. 7. In an optical path on the lower side, refractive power of some components is shown. Although the display device 30 is not illustrated, left circularly polarized light first enters the half mirror 41 as in FIG. 2A.

The left circularly polarized light passing through the half mirror 41 enters the lens 42, and is emitted in the dispersion direction due to the negative refractive power (P(−)) of the lens 42. The left circularly polarized light from the lens 42 enters the retardation plate 43, and is converted to 0° linearly polarized light. The 0° linearly polarized light from the retardation plate 43 is reflected by the reflective polarizing plate 44 whose reflection axis is 0°, and the light enters the retardation plate 43 and is converted to left circularly polarized light.

The left circularly polarized light from the retardation plate 43 enters the lens 42, and is emitted in the focusing direction due to the positive refractive power (P(+)). The left circularly polarized light from the lens 42 is reflected by the half mirror 41 and inverted to right circularly polarized light. The right circularly polarized light that is inverted by the half mirror 41 is subjected to the positive refractive power (P(+)) and enters the lens 42, and then emitted in the focusing direction due to the positive refractive power (P(+)) of the lens 42.

The right circularly polarized light from the lens 42 enters the retardation plate 43, and is converted to 90° linearly polarized light. The 90° linearly polarized light from the retardation plate 43 passes through the reflective polarizing plate 44 whose transmission axis is 90° and the lens 45, and enters the eye 10.

In this manner, light dispersion and focusing can be performed also in the case where the rotation direction of the circularly polarized light is not inverted by the lens 42.

Figure 8A:
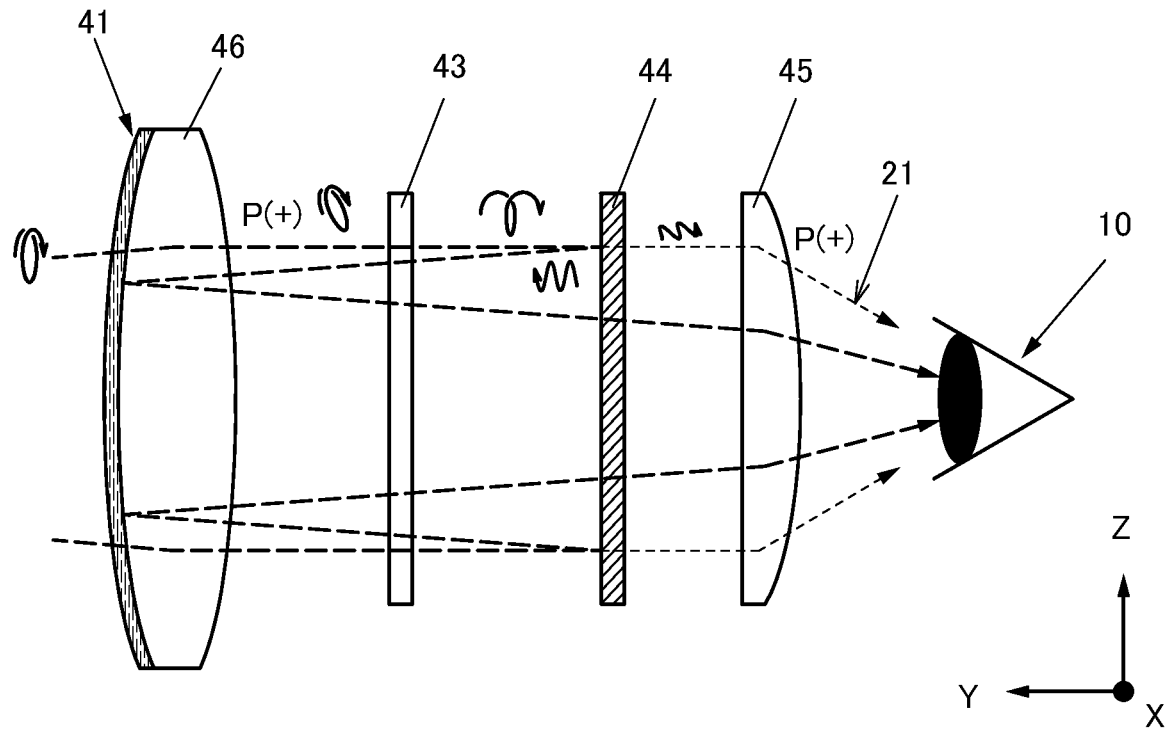
FIGS. 8A and 8B each illustrate stray light.

Next, a reduction in defects caused by stray light, which is one of the effects of one embodiment of the present invention, is described. FIG. 8A illustrates an example of a conventional optical device for comparison, in which a convex lens 46 is substituted for the lens 42 in the structure of one embodiment of the present invention. The half mirror 41 is formed on one surface of the convex lens 46 such that the reflection surface becomes a concave surface. Although the details are omitted, as in one embodiment of the present invention, reflection and transmission can be selectively performed utilizing linearly polarized light, circularly polarized light, the half mirror, and the reflective polarizing plate.

In the case where the convex lens 46 is formed with a material with relatively high birefringence, such as a resin, the polarization state might be disrupted. In particular, in the case where circularly polarized light enters the convex lens 46, the light is likely to become elliptically polarized light under the influence of birefringence. When the elliptically polarized light whose polarization state is disrupted enters the retardation plate 43, the light is not converted to linearly polarized light by the retardation plate 43; as a result, the oscillation direction of the light is not coincident with the reflection axis of the reflective polarizing plate 44. For this reason, part of the light passes through the reflective polarizing plate 44 to become stray light 21. The stray light 21 travels in the direction of the eye 10 under the influence of the positive refractive power (P(+)) of the convex lens 46 and the lens 45, so that a defect that a user sees double images occurs, for example. Note that an image perceived due to the stray light 21 is called ghost in some cases.

Figure 8B:
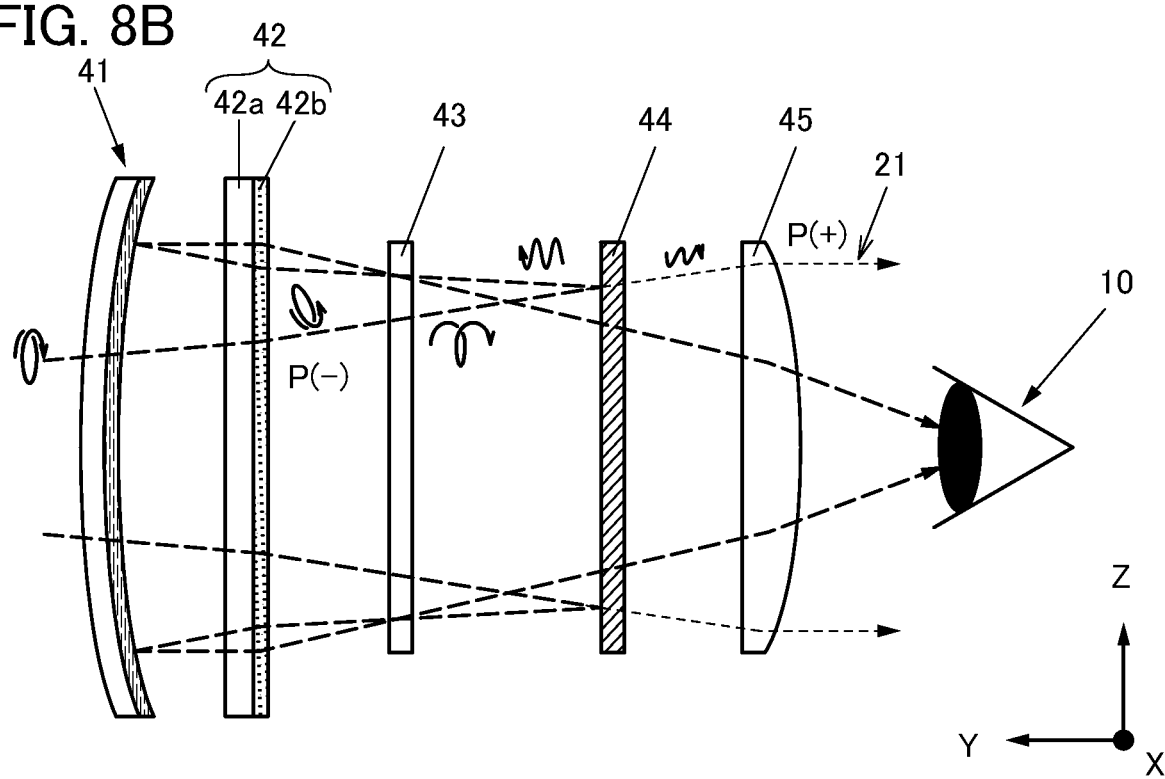

FIG. 8B illustrates stray light caused in the structure of one embodiment of the present invention. Note that the lens 42 used in one embodiment of the present invention has a function of inverting circularly polarized light due to birefringence, as described above. Although a structure in which the polarization state is not disrupted and stray light hardly occurs is ideal, the case where stray light occurs is described here.

The circularly polarized light which passes through the half mirror 41 and enters the lens 42 is subjected to the negative refractive power (P(−)) of the lens 42, travels in the dispersion direction, and enters the retardation plate 43. Here, the polarization state of the circularly polarized light that enters the retardation plate 43 is assumed to be disrupted and light from the retardation plate 43 is assumed to be elliptically polarized light whose oscillation direction is not coincide with the reflection axis of the reflective polarizing plate 44.

At this time, although part of the light passes through the reflective polarizing plate 44 to become the stray light 21 as in FIG. 8A, the stray light 21 enters the lens 45 while keeping the traveling direction (the dispersion direction); accordingly, the light is less likely to travel in the direction of the eye 10 even while being subjected to the positive refractive power (P(+)) of the lens 45. That is, even when the stray light 21 occurs, the stray light 21 can be prevented from being incident in the direction of the eye 10; as a result, a normal image which is formed by light passing through a normal optical path can be perceived.

Figure 9A:
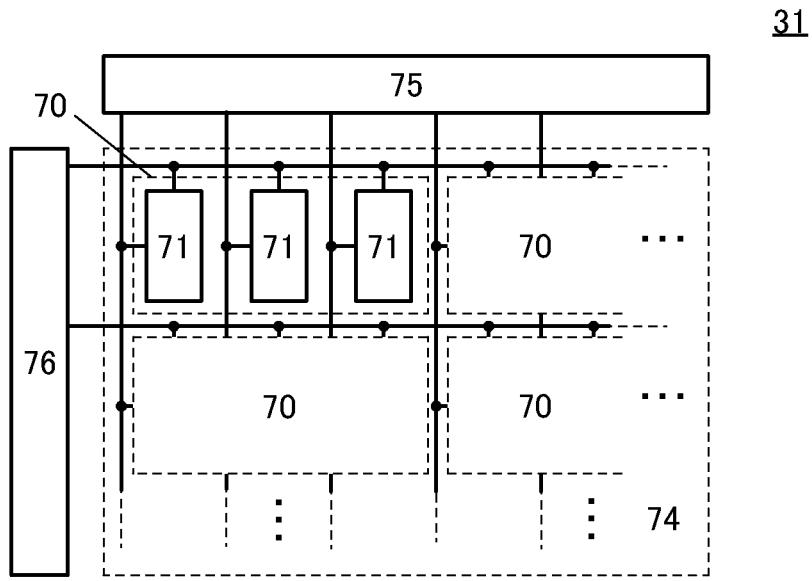
FIGS. 9A to 9C each illustrate a display panel.

FIG. 9A illustrates the display panel 31 included in the electronic device of one embodiment of the present invention. The display panel 31 includes a pixel array 74, a circuit 75, and a circuit 76. The pixel array 74 includes pixels 70 arranged in a column direction and a row direction.

The pixel 70 can include a plurality of subpixels 71. The subpixel 71 has a function of emitting light for display.

Note that in this specification, although a minimum unit in which independent operation is performed in one "pixel" is defined as a "subpixel" in the description for convenience, a "pixel" may be replaced with a "region" and a "subpixel" may be replaced with a "pixel".

The subpixel 71 includes a light-emitting device that emits visible light. As the light-emitting device, an EL device such as an organic light-emitting diode (OLED) or a quantum-dot light-emitting diode (QLED) is preferably used. As a light-emitting substance included in the EL device, a substance emitting fluorescence (a fluorescent material), a substance emitting phosphorescence (a phosphorescent material), a substance exhibiting thermally activated delayed fluorescence (a thermally activated delayed fluorescent (TADF) material), an inorganic compound (e.g., a quantum dot material), or the like can be used. A light-emitting diode (LED) such as a micro-LED can also be used as the light-emitting device.

The circuit 75 and the circuit 76 are driver circuits for driving the subpixel 71. The circuit 75 can have a function of a source driver circuit and the circuit 76 can have a function of a gate driver circuit. A shift register circuit or the like can be used as the circuit 75 and the circuit 76, for example.

Figure 9B:
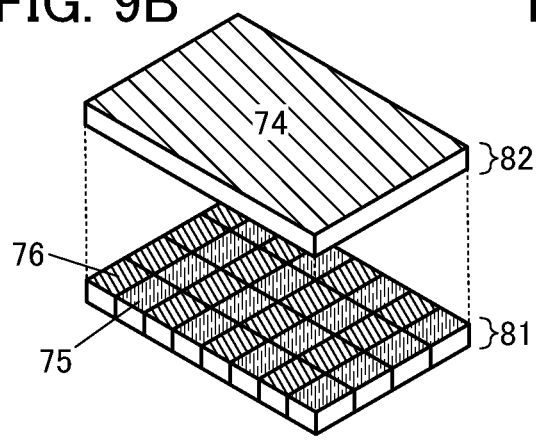

A structure illustrated in FIG. 9B in which the circuit 75 and the circuit 76 are provided in a layer 81, the pixel array 74 is provided in a layer 82, and the layer 81 and the layer 82 are overlapped with each other may be employed. This structure can narrow a bezel of the display device.

Since the driver circuits are provided below the pixel array 74, the wiring length can be shortened and the wiring capacitance can be reduced. Accordingly, a display panel capable of high-speed operation with low power consumption can be provided.

When each of the circuit 75 and the circuit 76 is divided and arranged as illustrated in FIG. 9B, part of the pixel array 74 can be driven. For example, part of image data in the pixel array 74 can be rewritten. Furthermore, part of the pixel array 74 can be operated at a different operation frequency.

The layouts and areas of the circuit 75 and the circuit 76 illustrated in FIG. 9B are examples, and can be changed as appropriate. Some parts of the circuit 75 and the circuit 76 can be provided in the same layer as the pixel array 74. Circuits such as a memory circuit, an arithmetic circuit, and a communication circuit may be provided in the layer 82.

In this structure, for example, a single crystal silicon substrate can be used as the layer 81 so that the circuit 75 and the circuit 76 can be formed with transistors including silicon in channel formation regions (hereinafter referred to as Si transistors), and pixel circuits included in the pixel array 74 provided in the layer 82 can be formed with transistors including a metal oxide in channel formation regions (hereinafter referred to as OS transistors). An OS transistor can be formed with a thin film and can be stacked over a Si transistor.

Figure 9C:
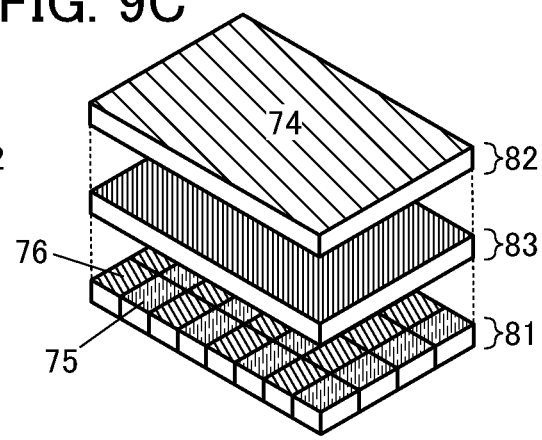

Note that a structure illustrated in FIG. 9C in which a layer 83 including OS transistors is provided between the layer 81 and the layer 82 may be employed. In the layer 83, some of the pixel circuits included in the pixel array 74 can be formed with OS transistors. Alternatively, some parts of the circuit 75 and the circuit 76 can be formed with OS transistors. Alternatively, some of the circuits that can be provided in the layer 82, such as a memory circuit, an arithmetic circuit, and a communication circuit, can be formed with OS transistors.

Figure 10A:
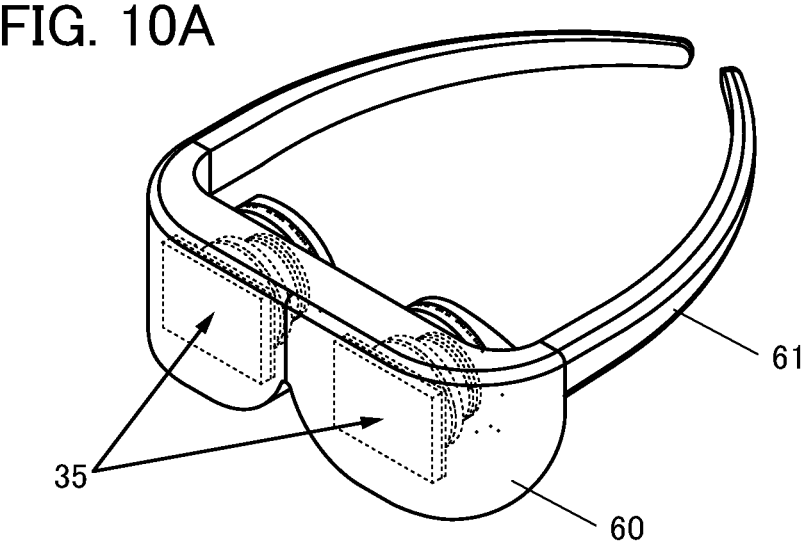
FIGS. 10A and 10B illustrate a glasses-type device.
Figure 10B:
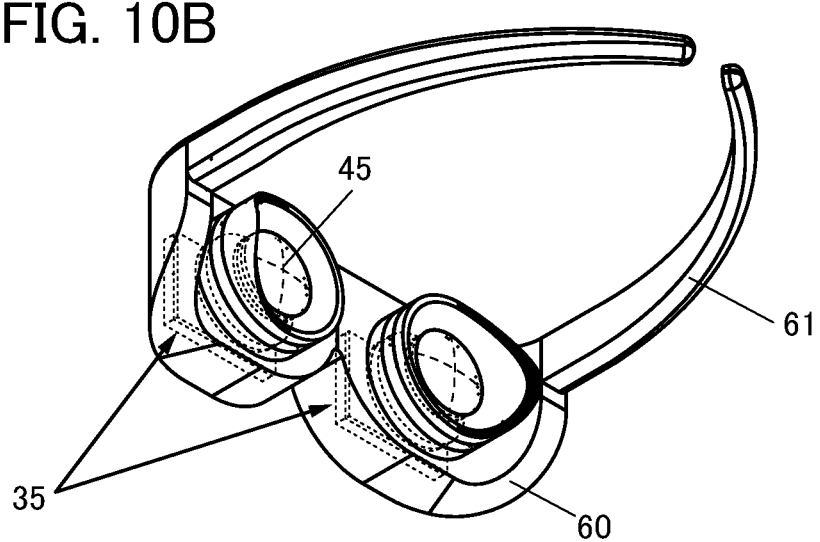

FIGS. 10A and 10B illustrate an example of a glasses-type device including the display device 30 and the optical device 40 which are illustrated in FIG. 1. Here, a combination of the display device 30 and the optical device 40 is denoted by dashed lines as a display unit 35. The glasses-type device includes two display units 35, and sometimes is called VR glasses depending on the usage of the glasses-type device.

The two display units 35 are incorporated in a housing 60 such that surfaces of the lenses 45 are exposed on the inner side. One of the display units 35 is for a right eye, the other is for a left eye, and each of the display units 35 displays an image for the corresponding eye, whereby a user can sense the three-dimensionality of the image.

The housing 60 or a band 61 may be provided with an input terminal and an output terminal. To the input terminal, a cable for supplying, for example, a video signal from a video output device or the like or power for charging a battery provided in the housing 60 can be connected. The output terminal can function as, for example, an audio output terminal to which earphones, headphones, or the like can be connected. Note that in the case where audio data can be output by wireless communication or sound is output from an external video output device, the audio output terminal is not necessarily provided.

A wireless communication module, a memory module, and the like may be provided inside the housing 60 or the band 61. A content to be watched can be downloaded via wireless communication using the wireless communication module and stored in the memory module. In this manner, the user can watch the downloaded content offline whenever the user likes.

In addition, a sight line sensor may be provided in the housing 60. For example, operation buttons for power-on, power-off, sleep, volume control, channel change, menu display, selection, decision, and back, and operation buttons for play, stop, pause, fast forward, and rewinding of moving images are displayed and visually recognized, whereby the respective operations can be performed.

With use of the optical device 40 of one embodiment of the present invention for the glasses-type device, a small-sized and thin electronic device with low power consumption and high reliability is achieved.

At least part of this embodiment can be implemented in combination with any of the other embodiments described in this specification, as appropriate.

Embodiment 2

In this embodiment, structure examples of a display panel which can be used for the electronic device of one embodiment of the present invention will be described. The display panel described below as an example can be used for the display panel 31 in Embodiment 1.

One embodiment of the present invention is a display panel including a light-emitting device (also referred to as a light-emitting element). The display panel includes two or more pixels that emit light of different colors. Each of the pixels includes a light-emitting device. The light-emitting device includes a pair of electrodes and an EL layer therebetween. The light-emitting device is preferably an organic electroluminescent device (organic EL device). Two or more light-emitting devices emitting light of different colors include respective EL layers containing different light-emitting materials. For example, three kinds of light-emitting devices emitting red (R), green (G), and blue (B) light are included, whereby a full-color display panel can be obtained.

In the case of manufacturing a display panel including a plurality of light-emitting devices emitting light of different colors, at least layers (light-emitting layers) containing light-emitting materials each need to be formed in an island shape. In a known method for separately forming part or the whole of an EL layer, an island-shaped organic film is formed by an evaporation method using a shadow mask such as a metal mask. However, this method has difficulty in achieving high resolution and a high aperture ratio of a display panel because in this method, a deviation from the designed shape and position of the island-shaped organic film is caused by various influences such as the low accuracy of the metal mask position, the positional deviation between the metal mask and a substrate, a warp of the metal mask, and the vapor-scattering-induced expansion of the outline of the formed film. In addition, the outline of a layer may blur during vapor deposition, whereby the thickness of its end portion may be small. That is, the thickness of an island-shaped light-emitting layer may vary from area to area. In the case of manufacturing a display panel with a large size, high definition, or high resolution, the manufacturing yield might be reduced because of low dimensional accuracy of the metal mask and deformation due to heat or the like. Thus, a measure has been taken for pseudo improvement in resolution (also referred to pixel density). As a specific measure, a unique pixel arrangement such as a PenTile pattern has been employed.

Note that in this specification and the like, the term "island shape" refers to a state where two or more layers formed using the same material in the same step are physically separated from each other. For example, "island-shaped light-emitting layer" means a state where the light-emitting layer and its adjacent light-emitting layer are physically separated from each other.

In one embodiment of the present invention, fine patterning of an EL layer is performed by photolithography without a shadow mask such as a fine metal mask (FMM). With the patterning, a high-resolution display panel with a high aperture ratio, which has been difficult to achieve, can be fabricated. Moreover, EL layers can be formed separately, enabling the display panel to perform extremely clear display with high contrast and high display quality. Note that, fine patterning of an EL layer may be performed using both a metal mask and photolithography, for example.

Part or the whole of the EL layer can be physically partitioned, inhibiting a leakage current flowing between adjacent light-emitting devices through a layer (also referred to as a common layer) shared by the light-emitting devices. This can prevent crosstalk due to unintended light emission, so that a display panel with extremely high contrast can be obtained. Specifically, a display panel having high current efficiency at low luminance can be obtained.

Note that the display panel of one embodiment of the present invention can also be obtained by combining white-light-emitting devices with a color filter. In that case, the light-emitting devices having the same structure can be provided in pixels (subpixels) emitting light of different colors, allowing all the layers to be common layers. Furthermore, part or the whole of the EL layer may be divided in a process using photolithography. Thus, a leakage current through a common layer is suppressed; accordingly, a high-contrast display panel is achieved. In particular, when an element has a tandem structure in which a plurality of light-emitting layers are stacked with a highly conductive intermediate layer therebetween, a leakage current through the intermediate layer can be effectively prevented, achieving a display panel with high luminance, high resolution, and high contrast.

In the case where the EL layer is processed by photolithography, part of the light-emitting layer is sometimes exposed to cause deterioration. For this reason, an insulating layer covering at least a side surface of the island-shaped light-emitting layer is preferably provided. The insulating layer may cover part of a top surface of the island-shaped EL layer. For the insulating layer, a material having a barrier property against water and oxygen is preferably used. For example, an inorganic insulating film that is less likely to diffuse water and oxygen can be used. Thus, the deterioration of the EL layer is inhibited, and a highly reliable display panel can be achieved.

Between two light-emitting devices that are adjacent to each other, there is a region (depression) where the EL layers of the light-emitting devices are not provided. In the case where the depression is covered with a common electrode or with a common electrode and a common layer, the common electrode might be disconnected (or "step-cut") by a step at an end portion of the EL layer, thereby causing insulation of the common electrode over the EL layer. In view of this, the local gap between the two adjacent light-emitting devices is preferably filled with a resin layer (also referred to as local filling planarization, or LFP) serving as a planarization film. The resin layer has a function of a planarization film. This structure can inhibit a step-cut of the common layer or the common electrode, making it possible to obtain a highly reliable display panel.

More specific structure examples of the display panel of one embodiment of the present invention will be described below with reference to drawings.

Structure Example 1

Figure 11A:
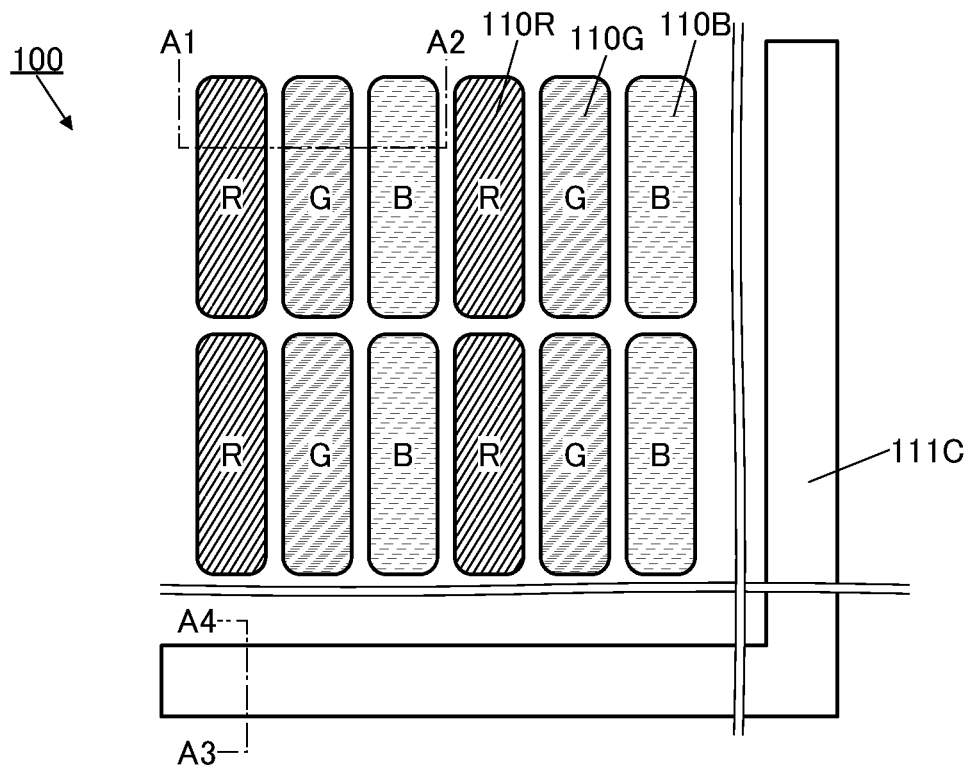
FIGS. 11A to 11C illustrate a structure example of a display panel.

FIG. 11A is a schematic top view of a display panel 100 of one embodiment of the present invention. The display panel 100 includes, over a substrate 101, a plurality of light-emitting devices 110R exhibiting red, a plurality of light-emitting devices 110G exhibiting green, and a plurality of light-emitting devices 110B exhibiting blue. In FIG. 11A, light-emitting regions of the light-emitting devices are denoted by R, G, and B to easily differentiate the light-emitting devices.

The light-emitting devices 110R, the light-emitting devices 110G, and the light-emitting devices 110B are arranged in a matrix. FIG. 11A illustrates what is called a stripe arrangement, in which light-emitting devices of the same color are arranged in one direction. Note that the arrangement of the light-emitting devices is not limited thereto; another arrangement such as an S stripe, delta, Bayer, zigzag, PenTile, or diamond pattern may also be used.

As each of the light-emitting devices 110R, 110G, and 110B, an EL device such as an organic light-emitting diode (OLED) or a quantum-dot light-emitting diode (QLED) is preferably used, for example. Examples of a light-emitting substance contained in the EL device include a substance exhibiting fluorescence (fluorescent material), a substance exhibiting phosphorescence (phosphorescent material), and a substance exhibiting thermally activated delayed fluorescence (a thermally activated delayed fluorescent (TADF) material). Examples of the light-emitting substance contained in the EL device include not only organic compounds but also inorganic compounds (e.g., quantum dot materials).

FIG. 11A also illustrates a connection electrode 111C that is electrically connected to a common electrode 113. The connection electrode 111C is supplied with a potential (e.g., an anode potential or a cathode potential) that is to be supplied to the common electrode 113. The connection electrode 111C is provided outside a display region where the light-emitting devices 110R and the like are arranged.

The connection electrode 111C can be provided along the outer periphery of the display region. For example, the connection electrode 111C may be provided along one side of the outer periphery of the display region or two or more sides of the outer periphery of the display region. That is, in the case where the display region has a rectangular top surface, a top surface of the connection electrode 111C can have a band shape (a rectangular shape), an L shape, a square bracket shape, a quadrangular shape, or the like.

Figure 11B:
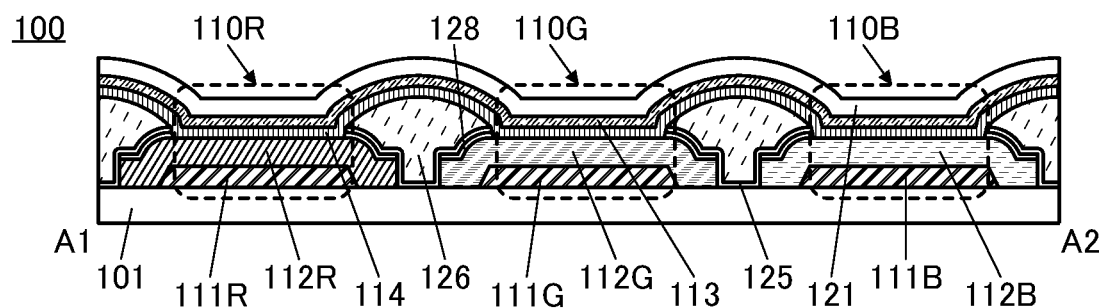
Figure 11C:
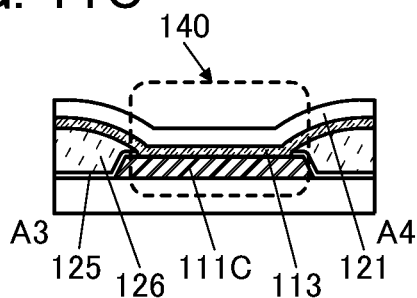

FIGS. 11B and 11C are the schematic cross-sectional views taken along dashed-dotted line A1-A2 and dashed-dotted line A3-A4 in FIG. 11A. FIG. 11B is a schematic cross-sectional view of the light-emitting device 110R, the light-emitting device 110G, and the light-emitting device 110B, and FIG. 11C is a schematic cross-sectional view of a connection portion 140 to which the connection electrode 111C and the common electrode 113 are connected.

The light-emitting device 110R includes a pixel electrode 111R, an organic layer 112R, a common layer 114, and the common electrode 113. The light-emitting device 110G includes a pixel electrode 111G, an organic layer 112G, the common layer 114, and the common electrode 113. The light-emitting device 110B includes a pixel electrode 111B, an organic layer 112B, the common layer 114, and the common electrode 113. The common layer 114 and the common electrode 113 are shared by the light-emitting device 110R, the light-emitting device 110G, and the light-emitting device 110B.

The organic layer 112R of the light-emitting device 110R contains at least a light-emitting organic compound that emits red light. The organic layer 112G of the light-emitting device 110G contains at least a light-emitting organic compound that emits green light. The organic layer 112B of the light-emitting device 110B contains at least a light-emitting organic compound that emits blue light. Each of the organic layers 112R, 112G, and 112B can also be referred to as an EL layer, and includes at least a layer containing a light-emitting substance (a light-emitting layer).

Hereafter, the term "light-emitting device 110" is sometimes used to describe matters common to the light-emitting devices 110R, 110G, and 110B. Likewise, in the description of matters common to the components that are distinguished using alphabets, such as the organic layers 112R, 112G, and 112B, reference numerals without such alphabets are sometimes used.

The organic layer 112 and the common layer 114 can each independently include one or more of an electron-injection layer, an electron-transport layer, a hole-injection layer, and a hole-transport layer. For example, the organic layer 112 can include a hole-injection layer, a hole-transport layer, a light-emitting layer, and an electron-transport layer that are stacked from the pixel electrode 111 side, and the common layer 114 can include an electron-injection layer.

The pixel electrode 111R, the pixel electrode 111G, and the pixel electrode 111B are provided for the respective light-emitting devices. Each of the common electrode 113 and common layer 114 is provided as a continuous layer shared by the light-emitting devices. A conductive film that has a property of transmitting visible light is used for either the respective pixel electrodes or the common electrode 113, and a reflective conductive film is used for the other. When the respective pixel electrodes are light-transmitting electrodes and the common electrode 113 is a reflective electrode, a bottom-emission display panel is obtained. When the respective pixel electrodes are reflective electrodes and the common electrode 113 is a light-transmitting electrode, a top-emission display panel is obtained. Note that when both the respective pixel electrodes and the common electrode 113 transmit light, a dual-emission display panel can be obtained.

A protective layer 121 is provided over the common electrode 113 so as to cover the light-emitting devices 110R, 110G, and 110B. The protective layer 121 has a function of preventing diffusion of impurities such as water into each light-emitting device from above.

The pixel electrode 111 preferably has an end portion with a tapered shape. In the case where the pixel electrode 111 has an end portion with a tapered shape, the organic layer 112 that is provided along the end portion of the pixel electrode 111 can also have a tapered shape. When the end portion of the pixel electrode 111 has a tapered shape, coverage with the organic layer 112 provided to cover the end portion of the pixel electrode 111 can be improved. The side surface of the pixel electrode 111 having such a tapered shape is preferred because it allows a foreign matter (such as dust or particles) mixing during the manufacturing process to be easily removed by treatment such as cleaning.

In this specification and the like, a tapered shape indicates a shape in which at least part of a side surface of a structure is inclined to a substrate surface. For example, a tapered shape preferably includes a region where the angle between the inclined side surface and the substrate surface (such an angle is also referred to as a taper angle) is less than 90°.

The organic layer 112 has an island shape as a result of processing by photolithography. Thus, the angle formed between a top surface and a side surface of an end portion of the organic layer 112 is approximately 90°. By contrast, an organic film formed using a fine metal mask (FMM) or the like has a thickness that tends to gradually decrease with decreasing distance to an end portion, and has a top surface forming a slope in an area extending greater than or equal to 1 µm and less than or equal to 10 µm from the end portion, for example; thus, such an organic film has a shape whose top surface and side surface cannot be easily distinguished from each other.

An insulating layer 125, a resin layer 126, and a layer 128 are included between two adjacent light-emitting devices.

Between two adjacent light-emitting devices, a side surface of the organic layer 112 of one light-emitting device faces a side surface of the organic layer 112 of the other light-emitting device with a resin layer 126 between the side surfaces. The resin layer 126 is positioned between two adjacent light-emitting devices so as to fill the region between the end portions of their organic layers 112 and the region between the two organic layers 112. The resin layer 126 has a top surface with a smooth convex shape. The top surface of the resin layer 126 is covered with the common layer 114 and the common electrode 113.

The resin layer 126 functions as a planarization film that fills a step between two adjacent light-emitting devices. Providing the resin layer 126 can prevent a phenomenon in which the common electrode 113 is divided by a step at an end portion of the organic layer 112 (also referred to as disconnection) from occurring and the common electrode 113 over the organic layer 112 from being insulated. The resin layer 126 can also be referred to as a local filling planarization (LFP) layer.

An insulating layer containing an organic material can be suitably used as the resin layer 126. Examples of materials used for the resin layer 126 include an acrylic resin, a polyimide resin, an epoxy resin, an imide resin, a polyamide resin, a polyimide-amide resin, a silicone resin, a siloxane resin, a benzocyclobutene-based resin, a phenol resin, and precursors of these resins. The resin layer 126 may be formed using an organic material such as polyvinyl alcohol (PVA), polyvinyl butyral, polyvinylpyrrolidone, polyethylene glycol, polyglycerin, pullulan, water-soluble cellulose, or an alcohol-soluble polyamide resin.

A photosensitive resin can also be used for the resin layer 126. A photoresist may be used for the photosensitive resin. As the photosensitive resin, a positive photosensitive material or a negative photosensitive material can be used.

The resin layer 126 may contain a material absorbing visible light. For example, the resin layer 126 itself may be made of a material absorbing visible light, or the resin layer 126 may contain a pigment absorbing visible light. For example, the resin layer 126 can be formed using a resin that can be used as a color filter transmitting red, blue, or green light and absorbing light of the other colors; or a resin that contains carbon black as a pigment and functions as a black matrix.

The insulating layer 125 is provided to be in contact with the side surface of the organic layer 112 and to cover an upper end portion of the organic layer 112. Part of the insulating layer 125 is in contact with a top surface of the substrate 101.

The insulating layer 125 is positioned between the resin layer 126 and the organic layer 112 to function as a protective film for preventing contact between the resin layer 126 and the organic layer 112. In the case of bringing the resin layer 126 into contact with the organic layer 112, the organic layer 112 might be dissolved by an organic solvent or the like used in formation of the resin layer 126. In view of this, the insulating layer 125 is provided between the organic layer 112 and the resin layer 126 to protect the side surface of the organic layer.

The insulating layer 125 can be an insulating layer containing an inorganic material. As the insulating layer 125, an inorganic insulating film such as an oxide insulating film, a nitride insulating film, an oxynitride insulating film, or a nitride oxide insulating film can be used, for example. The insulating layer 125 may have a single-layer structure or a stacked-layer structure. Examples of the oxide insulating film include a silicon oxide film, an aluminum oxide film, a magnesium oxide film, an indium gallium zinc oxide film, a gallium oxide film, a germanium oxide film, an yttrium oxide film, a zirconium oxide film, a lanthanum oxide film, a neodymium oxide film, a hafnium oxide film, and a tantalum oxide film. Examples of the nitride insulating film include a silicon nitride film and an aluminum nitride film. Examples of the oxynitride insulating film include a silicon oxynitride film and an aluminum oxynitride film. Examples of the nitride oxide insulating film include a silicon nitride oxide film and an aluminum nitride oxide film. In particular, when a metal oxide film such as an aluminum oxide film or a hafnium oxide film or an inorganic insulating film such as a silicon oxide film that is formed by an ALD method is used for the insulating layer 125, the insulating layer 125 has a small number of pin holes and excels in a function of protecting the EL layer.

Note that in this specification and the like, oxynitride refers to a material in which an oxygen content is higher than a nitrogen content, and nitride oxide refers to a material in which a nitrogen content is higher than an oxygen content. For example, silicon oxynitride refers to a material in which an oxygen content is higher than a nitrogen content, and silicon nitride oxide refers to a material in which a nitrogen content is higher than an oxygen content.

The insulating layer 125 can be formed by a sputtering method, a CVD method, a PLD method, an ALD method, or the like. The insulating layer 125 is preferably formed by an ALD method achieving good coverage.

Between the insulating layer 125 and the resin layer 126, a reflective film (e.g., a metal film containing one or more of silver, palladium, copper, titanium, aluminum, and the like) may be provided to reflect the light that is emitted from the light-emitting layer. In this case, the light extraction efficiency can be increased.

Part of a protective layer (also referred to as a mask layer or a sacrificial layer) for protecting the organic layer 112 during etching of the organic layer 112 survives the etching to become the layer 128. For the layer 128, the material that can be used for the insulating layer 125 can be used. Particularly, the layer 128 and the insulating layer 125 are preferably formed with the same material, in which case an apparatus or the like for processing can be used in common.

In particular, a metal oxide film such as an aluminum oxide film or a hafnium oxide film and an inorganic insulating film such as a silicon oxide film which are formed by an ALD method have a small number of pinholes, and thus excel in the function of protecting the EL layer and are preferably used for the insulating layer 125 and the layer 128.

The protective layer 121 can have, for example, a single-layer structure or a stacked-layer structure at least including an inorganic insulating film. Examples of the inorganic insulating film include an oxide film or a nitride film such as a silicon oxide film, a silicon oxynitride film, a silicon nitride oxide film, a silicon nitride film, an aluminum oxide film, an aluminum oxynitride film, or a hafnium oxide film. Alternatively, a semiconductor material or a conductive material such as indium gallium oxide, indium zinc oxide, indium tin oxide, or indium gallium zinc oxide may be used for the protective layer 121.

As the protective layer 121, a stacked film of an inorganic insulating film and an organic insulating film can be used. For example, a structure in which an organic insulating film is sandwiched between a pair of inorganic insulating films is preferable. Furthermore, it is preferred that the organic insulating film function as a planarization film. With this structure, a top surface of the organic insulating film can be flat, and accordingly, coverage with the inorganic insulating film over the organic insulating film is improved, leading to an improvement in barrier properties. Moreover, since a top surface of the protective layer 121 is flat, a preferable effect can be obtained; when a component (e.g., a color filter, an electrode of a touch sensor, a lens array, or the like) is provided above the protective layer 121, the component is less affected by an uneven shape caused by the lower structure.

FIG. 11C illustrates the connection portion 140 in which the connection electrode 111C is electrically connected to the common electrode 113. In the connection portion 140, an opening portion is provided in the insulating layer 125 and the resin layer 126 over the connection electrode 111C. In the opening portion, the connection electrode 111C and the common electrode 113 are electrically connected to each other.

Although FIG. 11C illustrates the connection portion 140 in which the connection electrode 111C and the common electrode 113 are electrically connected to each other, the common electrode 113 may be provided over the connection electrode 111C with the common layer 114 therebetween. Particularly in the case of the common layer 114 that includes a carrier-injection layer, for example, the common layer 114 can be formed to be thin using a material with sufficiently low electrical resistivity and thus can be in the connection portion 140 almost without causing any problem. Accordingly, the common electrode 113 and the common layer 114 can be formed using the same shielding mask, whereby manufacturing costs can be reduced.

Structure Example 2

A display panel partly different from Structure example 1 is described below. Note that Structure example 1 is referred to for the same portions and the description is skipped here in some cases.

Figure 12A:
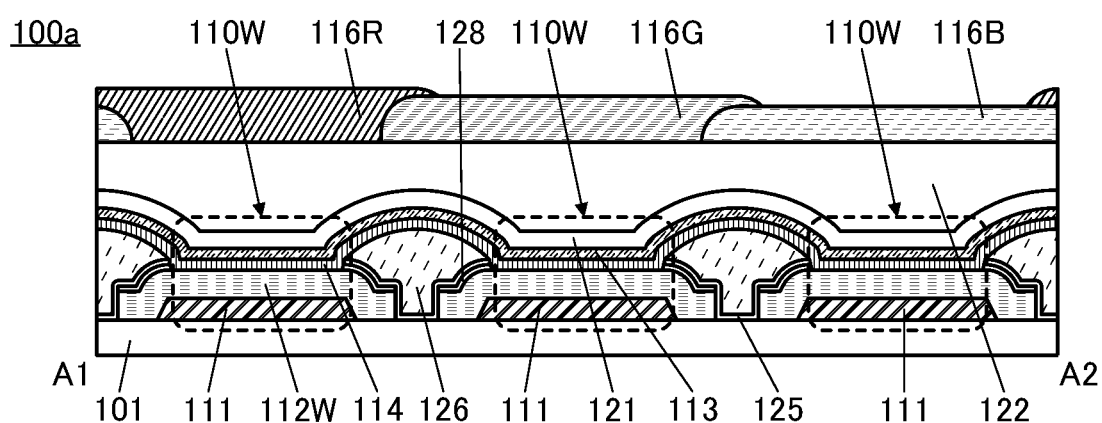
FIGS. 12A and 12B each illustrate a structure example of a display panel.

FIG. 12A is a schematic cross-sectional view of a display panel 100a. The display panel 100a is different from the display panel 100 mainly in the structure of the light-emitting device and including a coloring layer.

The display panel 100a includes a light-emitting device 100W emitting white light. The light-emitting device 100W includes the pixel electrode 111, an organic layer 112W, the common layer 114, and the common electrode 113. The organic layer 112W emits white light. For example, the organic layer 112W can contain two or more kinds of light-emitting materials that emit light of complementary colors. For example, the organic layer 112W can contain a light-emitting organic compound emitting red light, a light-emitting organic compound emitting green light, and a light-emitting organic compound emitting blue light. Alternatively, the organic layer 112W may contain a light-emitting organic compound emitting blue light and a light-emitting organic compound emitting yellow light.

The organic layer 112W is divided between the two adjacent light-emitting devices 100W. Thus, a leakage current that might flow between the adjacent light-emitting devices 100W through the organic layer 112W can be inhibited and crosstalk due to the leakage current can be inhibited. Accordingly, the display panel can have high contrast and high color reproducibility.

An insulating layer 122 functioning as a planarization film is provided over the protective layer 121, and a coloring layer 116R, a coloring layer 116G, and a coloring layer 116B are provided over the insulating layer 122.

An organic resin film or an inorganic insulating film with a flat top surface can be used as the insulating layer 122. The insulating layer 122 is a formation surface on which the coloring layer 116R, the coloring layer 116G, and the coloring layer 116B are formed. Thus, with a flat top surface of the insulating layer 122, the thickness of the coloring layer 116R or the like can be uniform and color purity of light extracted from each light-emitting device can be increased. Note that if the thickness of the coloring layer 116R or the like is not uniform, the amount of light absorption varies depending on a region in the coloring layer 116R, which might decrease color purity of light extracted from each light-emitting device.

Structure Example 3

Figure 12B:
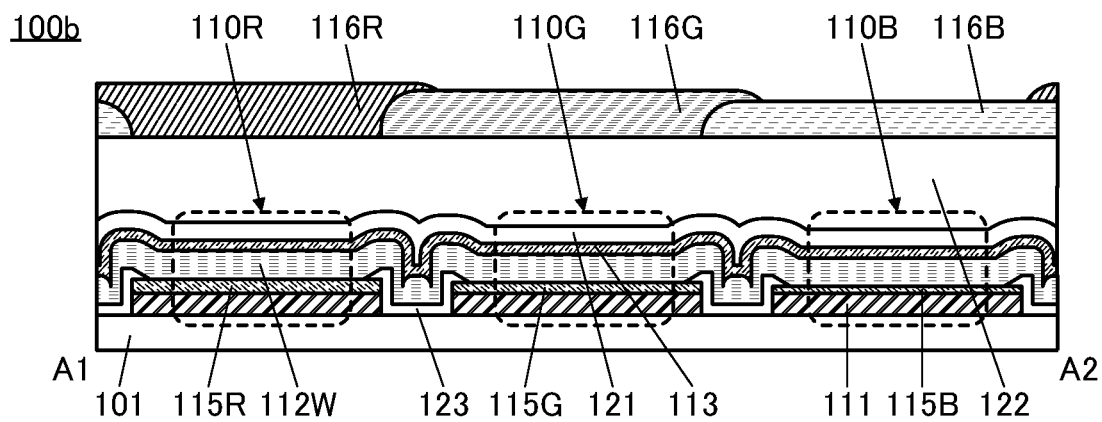

FIG. 12B is a schematic cross-sectional view of a display panel 100b.

The light-emitting device 110R includes the pixel electrode 111, a conductive layer 115R, the organic layer 112W, and the common electrode 113. The light-emitting device 110G includes the pixel electrode 111, a conductive layer 115G, the organic layer 112W, and the common electrode 113. The light-emitting device 110B includes the pixel electrode 111, a conductive layer 115B, the organic layer 112W, and the common electrode 113. The conductive layers 115R, 115G, and 115B each have a light-transmitting property and function as an optical adjustment layer.

A film reflecting visible light is used for the pixel electrode 111 and a film having a property of reflecting and transmitting visible light is used for the common electrode 113, whereby a micro optical resonator (microcavity) structure can be obtained. In this case, by adjusting the thicknesses of the conductive layers 115R, 115G, and 115B to obtain optimal optical path lengths, light with different wavelengths and increased intensities can be extracted from the light-emitting devices 110R, 110G, and 110B even when the organic layer 112W emitting white light is used.

Furthermore, the coloring layers 116R, 116G, and 116B are provided on the optical paths of the light-emitting devices 110R, 110G, and 110B, respectively, whereby light with high color purity can be extracted from each light-emitting device.

An insulating layer 123 that covers an end portion of the pixel electrode 111 and an end portion of an optical adjustment layer 115 is provided. The insulating layer 123 preferably has an end portion with a tapered shape. The insulating layer 123 can increase coverage with the organic layer 112W, the common electrode 113, the protective layer 121, and the like provided over the insulating layer 123.

The organic layer 112W and the common electrode 113 are each provided as one continuous film shared by the light-emitting devices. Such a structure is preferable because the manufacturing process of the display panel can be greatly simplified.

Here, the end portion of the pixel electrode 111 is preferably substantially perpendicular to the top surface of the substrate 101. In this manner, a steep portion can be formed on the surface of the insulating layer 123, and thus part of the organic layer 112W covering the steep portion can have a small thickness or part of the organic layer 112W can be separated. Accordingly, a leakage current generated between adjacent light-emitting devices through the organic layer 112W can be inhibited without processing the organic layer 112W by photolithography or the like.

The above is the description of the structure example of the display panel.

[Pixel Layout]

Pixel layouts different from the layout in FIG. 11A will be mainly described below. There is no particular limitation on the arrangement of the light-emitting devices (subpixels), and a variety of methods can be employed.

Examples of a top surface shape of the subpixel include polygons such as a triangle, a tetragon (including a rectangle and a square), and a pentagon; polygons with rounded corners; an ellipse; and a circle. Here, a top surface shape of the subpixel corresponds to a top surface shape of a light-emitting region of the light-emitting device.

Figure 13A:
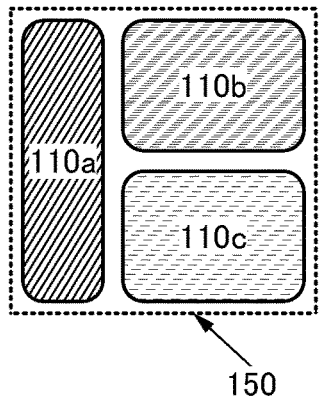
FIGS. 13A to 13F each illustrate a configuration example of a pixel.

A pixel 150 illustrated in FIG. 13A employs S-stripe arrangement. The pixel 150 in FIG. 13A consists of three subpixels: light-emitting devices 110a, 110b, and 110c. For example, the light-emitting device 110a may be a blue-light-emitting device, the light-emitting device 110b may be a red-light-emitting device, and the light-emitting device 110c may be a green-light-emitting device.

Figure 13B:
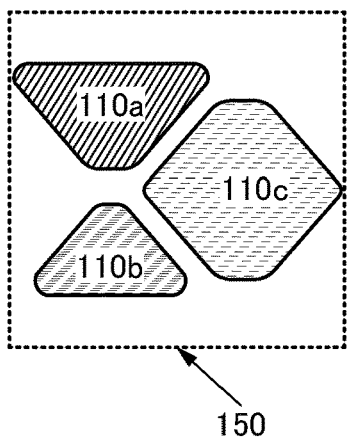

The pixel 150 illustrated in FIG. 13B includes the light-emitting device 110a whose top surface has a rough trapezoidal or rough triangle shape with rounded corners, the light-emitting device 110b whose top surface has a rough trapezoidal or rough triangle shape with rounded corners, and the light-emitting device 110c whose top surface has a rough tetragonal or rough hexagonal shape with rounded corners. The light-emitting device 110a has a larger light-emitting area than the light-emitting device 110b. In this manner, the shapes and sizes of the light-emitting devices can be determined independently. For example, the size of a light-emitting device with higher reliability can be smaller. For example, the light-emitting device 110a may be a green-light-emitting device, the light-emitting device 110b may be a red-light-emitting device, and the light-emitting device 110c may be a blue-light-emitting device.

Figure 13C:
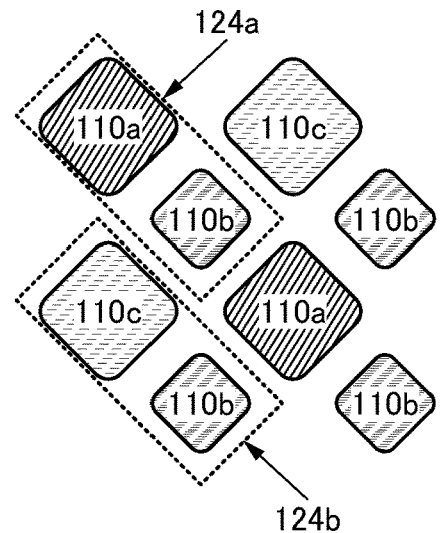

Pixels 124a and 124b illustrated in FIG. 13C employ PenTile arrangement. FIG. 13C illustrates an example in which the pixels 124a including the light-emitting devices 110a and 110b and the pixels 124b including the light-emitting devices 110b and 110c are alternately arranged. For example, the light-emitting device 110a may be a red-light-emitting device, the light-emitting device 110b may be a green-light-emitting device, and the light-emitting device 110c may be a blue-light-emitting device.

Figure 13D:
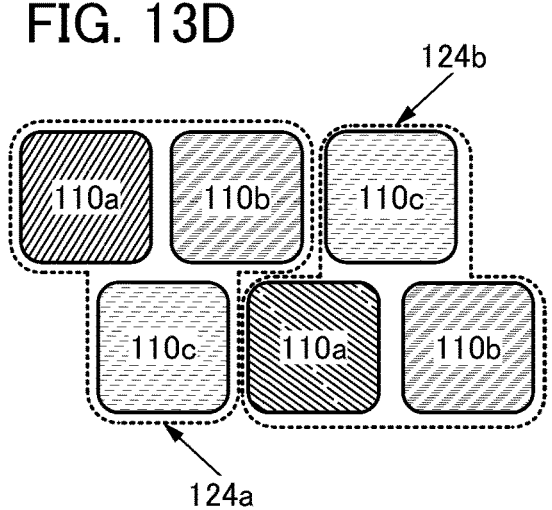
Figure 13E:
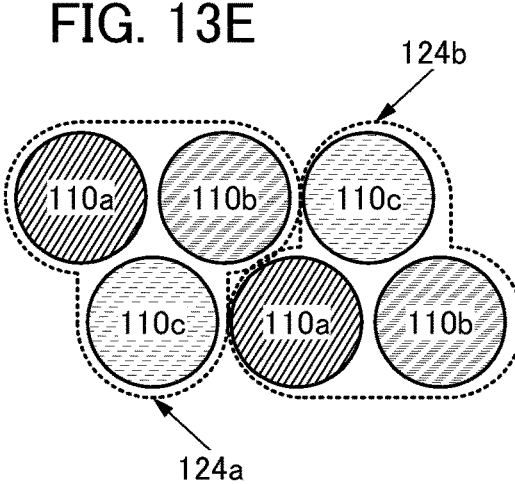

The pixels 124a and 124b illustrated in FIGS. 13D and 13E employ delta arrangement. The pixel 124a includes two light-emitting devices (the light-emitting devices 110a and 110b) in the upper row (first row) and one light-emitting device (the light-emitting device 110c) in the lower row (second row). The pixel 124b includes one light-emitting device (the light-emitting device 110c) in the upper row (first row) and two light-emitting devices (the light-emitting devices 110a and 110b) in the lower row (second row). For example, the light-emitting device 110a may be a red-light-emitting device, the light-emitting device 110b may be a green-light-emitting device, and the light-emitting device 110c may be a blue-light-emitting device.

FIG. 13D illustrates an example where the top surface of each light-emitting device has a rough tetragonal shape with rounded corners, and FIG. 13E illustrates an example where the top surface of each light-emitting device is circular.

Figure 13F:
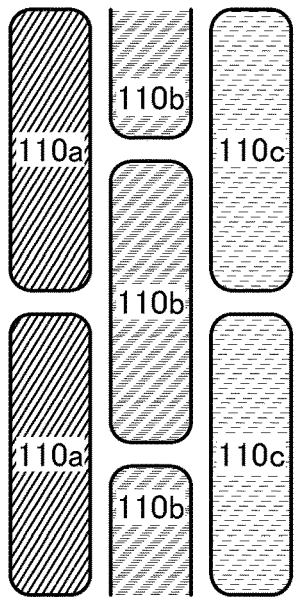

FIG. 13F illustrates an example where light-emitting devices of different colors are arranged in a zigzag manner. Specifically, the positions of the top sides of two light-emitting devices arranged in the column direction (e.g., the light-emitting device 110a and the light-emitting device 110b or the light-emitting device 110b and the light-emitting device 110c) are not aligned in the top view. For example, the light-emitting device 110a may be a red-light-emitting device, the light-emitting device 110b may be a green-light-emitting device, and the light-emitting device 110c may be a blue-light-emitting device.

In photolithography, as a pattern to be formed by processing becomes finer, the influence of light diffraction becomes more difficult to ignore; therefore, the fidelity in transferring a photomask pattern by light exposure is degraded, and it becomes difficult to process a resist mask into a desired shape. Thus, a pattern with rounded corners is likely to be formed even with a rectangular photomask pattern. Consequently, a top surface of a light-emitting device may have a polygonal shape with rounded corners, an elliptical shape, a circular shape, or the like.

Furthermore, in the method for manufacturing the display panel of one embodiment of the present invention, the EL layer is processed into an island shape with the use of a resist mask. A resist film formed over the EL layer needs to be cured at a temperature lower than the upper temperature limit of the EL layer. Therefore, the resist film is insufficiently cured in some cases depending on the upper temperature limit of the material of the EL layer and the curing temperature of the resist material. An insufficiently cured resist film may have a shape different from a desired shape by processing. As a result, a top surface of the EL layer may have a polygonal shape with rounded corners, an elliptical shape, a circular shape, or the like. For example, when a resist mask with a square top surface is intended to be formed, a resist mask with a circular top surface may be formed, and the top surface of the EL layer may be circular.

To obtain a desired top surface shape of the EL layer, a technique of correcting a mask pattern in advance so that a transferred pattern agrees with a design pattern (an optical proximity correction (OPC) technique) may be used. Specifically, with the OPC technique, a pattern for correction is added to a corner portion or the like of a figure on a mask pattern.

The above is the description of the pixel layouts.

At least part of this embodiment can be implemented in combination with any of the other embodiments described in this specification, as appropriate.

Embodiment 3

In this embodiment, other structure examples of a display panel that can be used for the electronic device of one embodiment of the present invention will be described.

The display panel of this embodiment has high resolution. Specifically, the display panel is suitably used for display portions of wearable devices capable of being worn on a head, such as a VR device (e.g., a head-mounted display) and a glasses-type AR device.

[Display Module]

Figure 14A:
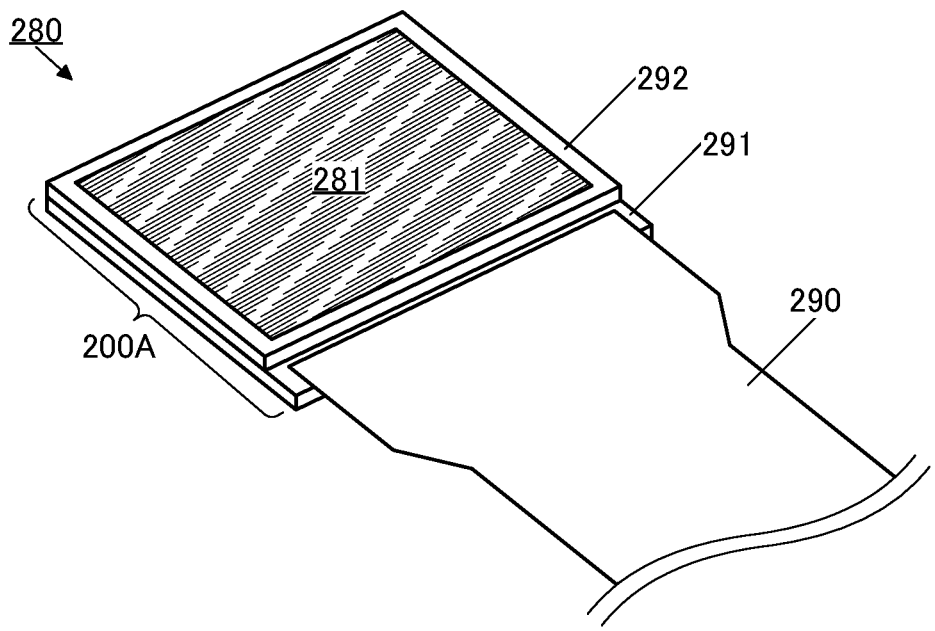
FIGS. 14A and 14B illustrate a structure example of a display panel.

FIG. 14A is a perspective view of a display module 280. The display module 280 includes a display panel 200A and an FPC 290. Note that the display panel included in the display module 280 is not limited to the display panel 200A and may be any of display panels 200B to 200F to be described later.

The display module 280 includes a substrate 291 and a substrate 292. The display module 280 includes a display portion 281. The display portion 281 is a region where an image is displayed.

Figure 14B:
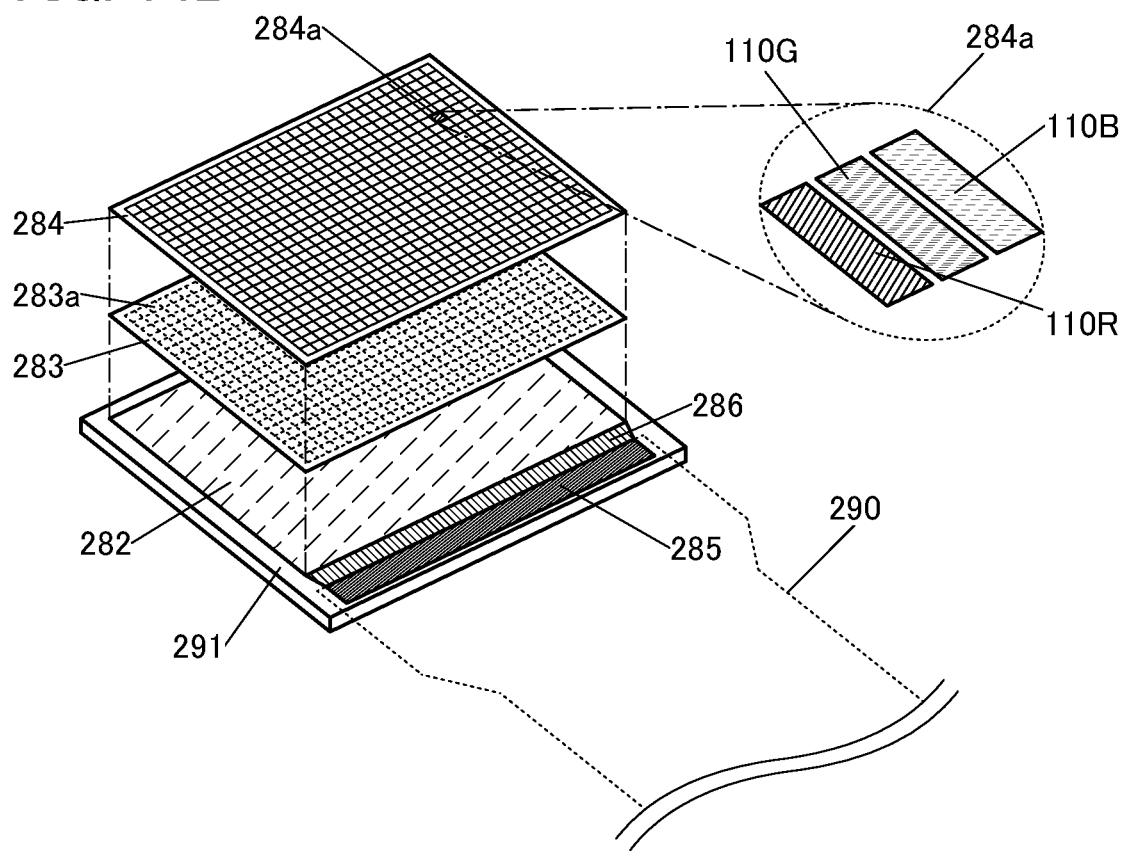

FIG. 14B is a perspective view schematically illustrating a structure on the substrate 291 side. Over the substrate 291, a circuit portion 282, a pixel circuit portion 283 over the circuit portion 282, and a pixel portion 284 over the pixel circuit portion 283 are stacked. A terminal portion 285 to be connected to the FPC 290 is provided in a portion over the substrate 291 that does not overlap with the pixel portion 284. The terminal portion 285 and the circuit portion 282 are electrically connected to each other through a wiring portion 286 formed of a plurality of wirings.

The pixel portion 284 includes a plurality of pixels 284a arranged periodically. An enlarged view of one pixel 284a is illustrated on the right side in FIG. 14B. The pixel 284a includes the light-emitting device 110R emitting red light, the light-emitting device 110G emitting green light, and the light-emitting device 110B emitting blue light.

The pixel circuit portion 283 includes a plurality of pixel circuits 283a arranged periodically. One pixel circuit 283a controls light emission from three light-emitting devices included in one pixel 284a. One pixel circuit 283a may include three circuits each of which controls light emission from one light-emitting device. For example, the pixel circuit 283a can include at least one selection transistor, one current control transistor (driving transistor), and a capacitor for a light-emitting device. In this case, a gate signal is input to a gate of the selection transistor, and a source signal is input to a source of the selection transistor. Thus, an active matrix display panel is achieved.

The circuit portion 282 includes a circuit for driving the pixel circuits 283a in the pixel circuit portion 283. For example, the circuit portion 282 preferably includes one or both of a gate line driver circuit and a source line driver circuit. The circuit portion 282 may also include at least one of an arithmetic circuit, a memory circuit, a power supply circuit, and the like. A transistor included in the circuit portion 282 may constitute part of the pixel circuit 283a. That is, the pixel circuit 283a may be constituted by a transistor included in the pixel circuit portion 283 and a transistor included in the circuit portion 282.

The FPC 290 functions as a wiring for supplying a video signal, a power supply potential, or the like to the circuit portion 282 from the outside. An IC may be mounted on the FPC 290.

The display module 280 can have a structure in which one or both of the pixel circuit portion 283 and the circuit portion 282 are stacked below the pixel portion 284; hence, the aperture ratio (effective display area ratio) of the display portion 281 can be significantly high. For example, the aperture ratio of the display portion 281 can be greater than or equal to 40% and less than 100%, preferably greater than or equal to 50% and less than or equal to 95%, further preferably greater than or equal to 60% and less than or equal to 95%. Furthermore, the pixels 284a can be arranged extremely densely and thus the display portion 281 can have extremely high resolution. For example, the pixels 284a are preferably arranged in the display portion 281 with a resolution greater than or equal to 2000 ppi, preferably greater than or equal to 3000 ppi, further preferably greater than or equal to 5000 ppi, still further preferably greater than or equal to 6000 ppi, and less than or equal to 20000 ppi or less than or equal to 30000 ppi.

Such a display module 280 has extremely high resolution, and thus can be suitably used for a VR device such as a head mounted display or a glasses-type AR device. For example, even with a structure in which the display portion of the display module 280 is seen through a lens, pixels of the extremely-high-resolution display portion 281 included in the display module 280 are prevented from being perceived when the display portion is enlarged by the lens, so that display providing a high level of immersion can be performed. Without being limited thereto, the display module 280 can be suitably used for electronic devices including a relatively small display portion. For example, the display module 280 can be favorably used in a display portion of a wearable electronic device, such as a wrist watch.

[Display Panel 200A]

Figure 15:
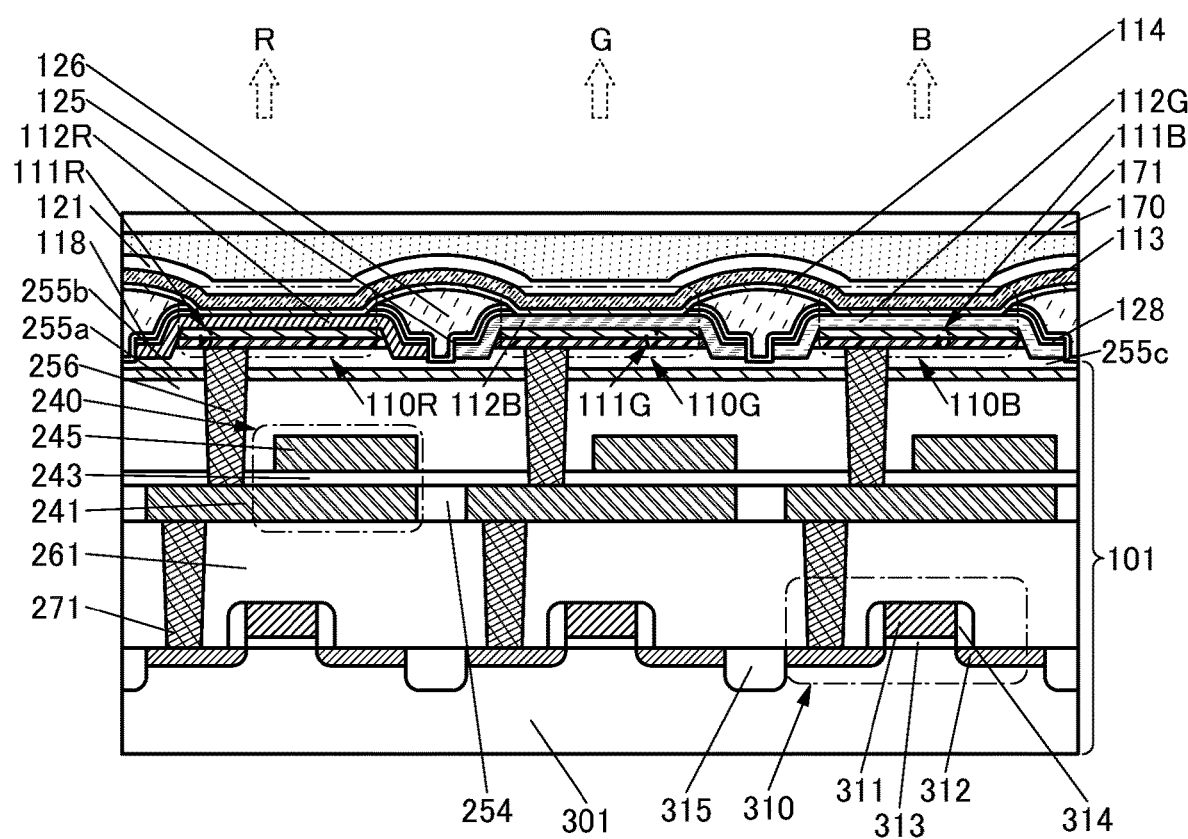
FIG. 15 illustrates a structure example of a display panel.

The display panel 200A illustrated in FIG. 15 includes a substrate 301, the light-emitting devices 110R, 110G, and 110B, a capacitor 240, and a transistor 310.

The substrate 301 corresponds to the substrate 291 illustrated in FIGS. 14A and 14B.

The transistor 310 includes a channel formation region in the substrate 301. As the substrate 301, a semiconductor substrate such as a single crystal silicon substrate can be used, for example. The transistor 310 includes part of the substrate 301, a conductive layer 311, low-resistance regions 312, an insulating layer 313, and an insulating layer 314. The conductive layer 311 functions as a gate electrode. The insulating layer 313 is positioned between the substrate 301 and the conductive layer 311 and functions as a gate insulating layer. The low-resistance regions 312 are regions where the substrate 301 is doped with an impurity, and function as a source and a drain. The insulating layer 314 is provided to cover the side surface of the conductive layer 311.

An element isolation layer 315 is provided between two adjacent transistors 310 to be embedded in the substrate 301.

An insulating layer 261 is provided to cover the transistor 310, and the capacitor 240 is provided over the insulating layer 261.

The capacitor 240 includes a conductive layer 241, a conductive layer 245, and an insulating layer 243 between the conductive layers 241 and 245. The conductive layer 241 functions as one electrode of the capacitor 240, the conductive layer 245 functions as the other electrode of the capacitor 240, and the insulating layer 243 functions as a dielectric of the capacitor 240.

The conductive layer 241 is provided over the insulating layer 261 and is embedded in an insulating layer 254. The conductive layer 241 is electrically connected to one of the source and the drain of the transistor 310 through a plug 271 embedded in the insulating layer 261. The insulating layer 243 is provided to cover the conductive layer 241. The conductive layer 245 is provided in a region overlapping the conductive layer 241 with the insulating layer 243 therebetween.

An insulating layer 255a is provided to cover the capacitor 240, an insulating layer 255b is provided over the insulating layer 255a, and an insulating layer 255c is provided over the insulating layer 255b.

An inorganic insulating film can be suitably used as each of the insulating layers 255a, 255b, and 255c. For example, it is preferred that a silicon oxide film be used as the insulating layers 255a and 255c and a silicon nitride film be used as the insulating layer 255b. This enables the insulating layer 255b to function as an etching protective film. Although this embodiment describes an example in which part of the insulating layer 255c is etched to form a recessed portion, the recessed portion is not necessarily provided in the insulating layer 255c.

The light-emitting device 110R, the light-emitting device 110G, and the light-emitting device 110B are provided over the insulating layer 255c. Embodiment 1 can be referred to for the structures of the light-emitting device 110R, the light-emitting device 110G, and the light-emitting device 110B.

In the display panel 200A, since the light-emitting devices of different colors are separately formed, the difference between the chromaticity at low luminance emission and that at high luminance emission is small. Furthermore, since the organic layers 112R, 112G, and 112B are separated from each other, crosstalk generated between adjacent subpixels can be prevented while the display panel 200A has high resolution. Accordingly, the display panel can have high resolution and high display quality.

In regions between adjacent light-emitting devices, the insulating layer 125, the resin layer 126, and the layer 128 are provided.

The pixel electrodes 111R, 111G, and 111B are each electrically connected to one of the source and the drain of the transistor 310 through a plug 256 embedded in the insulating layers 255a, 255b, and 255c, the conductive layer 241 embedded in the insulating layer 254, and the plug 271 embedded in the insulating layer 261. The top surface of the insulating layer 255c and the top surface of the plug 256 are level with or substantially level with each other. Any of a variety of conductive materials can be used for the plugs.

The protective layer 121 is provided over the light-emitting devices 110R, 110G, and 110B. A substrate 170 is bonded above the protective layer 121 with an adhesive layer 171.

An insulating layer covering an end portion of the top surface of the pixel electrode 111 is not provided between two adjacent pixel electrodes 111. Thus, the distances between adjacent light-emitting devices can be extremely shortened. Accordingly, the display panel can have high resolution or high definition.

[Display Panel 200B]

Figure 16:
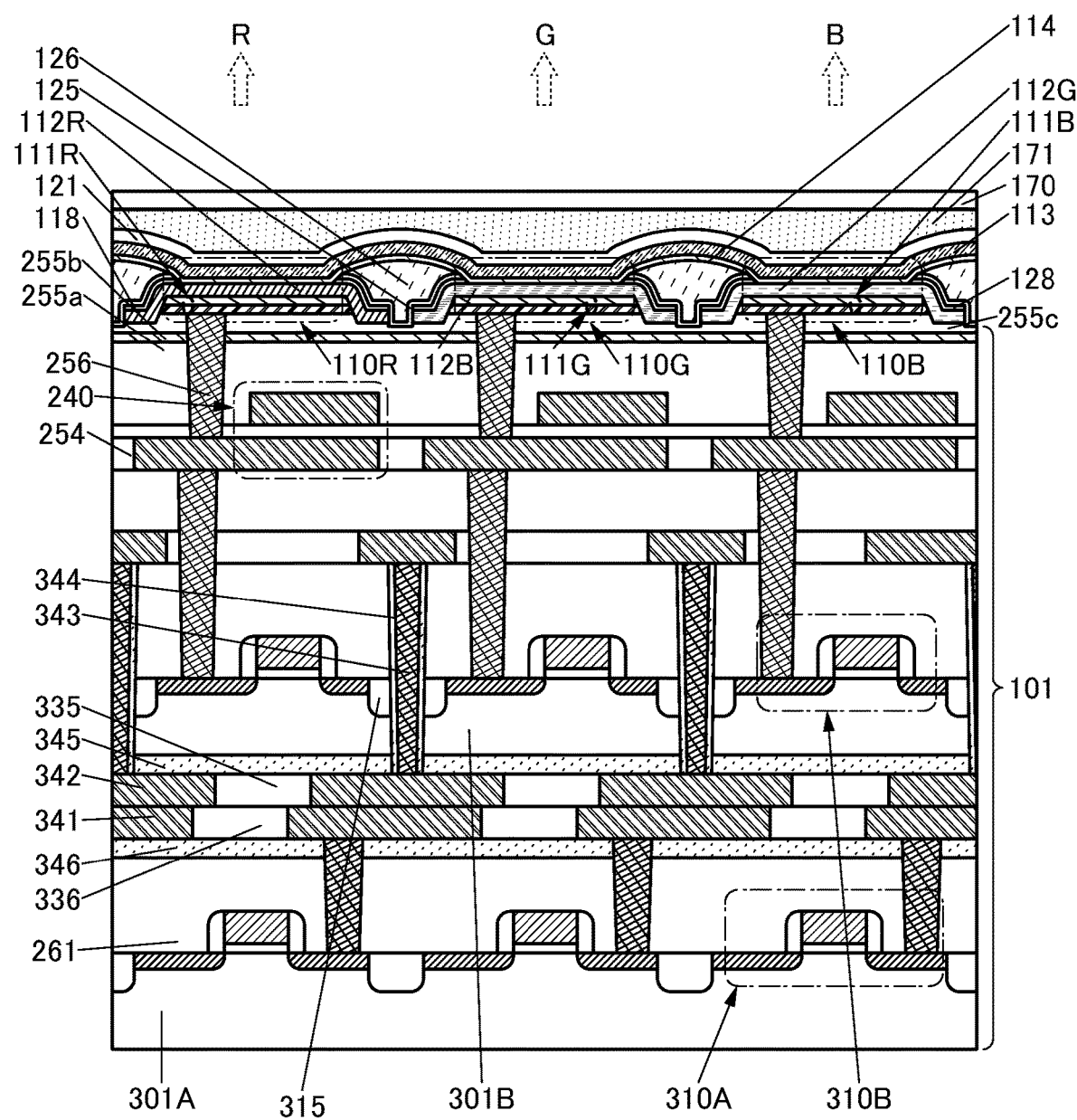
FIG. 16 illustrates a structure example of a display panel.

The display panel 200B illustrated in FIG. 16 has a structure in which a transistor 310A and a transistor 310B each having a channel formed in a semiconductor substrate are stacked. Note that in the following description of display panels, the description of portions similar to those of the above-described display panel may be omitted.

In the display panel 200B, a substrate 301B provided with the transistor 310B, the capacitor 240, and the light-emitting devices is attached to a substrate 301A provided with the transistor 310A.

Here, an insulating layer 345 is provided on a bottom surface of the substrate 301B. An insulating layer 346 is provided over the insulating layer 261 over the substrate 301A. The insulating layers 345 and 346 function as protective layers and can inhibit diffusion of impurities into the substrate 301B and the substrate 301A. As the insulating layers 345 and 346, an inorganic insulating film that can be used as the protective layer 121 or the insulating layer 332 can be used.

The substrate 301B is provided with a plug 343 that penetrates the substrate 301B and the insulating layer 345. An insulating layer 344 functioning as a protective layer is preferably provided to cover a side surface of the plug 343.

A conductive layer 342 is provided on the bottom side of the substrate 301B with the insulating layer 345 therebetween. The conductive layer 342 is embedded in an insulating layer 335. Bottom surfaces of the conductive layer 342 and the insulating layer 335 are planarized. The conductive layer 342 is electrically connected to the plug 343.

A conductive layer 341 is provided over the insulating layer 346 over the substrate 301A. The conductive layer 341 is embedded in an insulating layer 336. Top surfaces of the conductive layer 341 and the insulating layer 336 are planarized.

The conductive layers 341 and 342 are preferably formed using the same conductive material. For example, it is possible to use a metal film containing an element selected from Al, Cr, Cu, Ta, Ti, Mo, and W, or a metal nitride film containing any of the above elements as a component (a titanium nitride film, a molybdenum nitride film, or a tungsten nitride film). Copper is particularly preferably used for the conductive layers 341 and 342. In that case, it is possible to employ copper-to-copper (Cu-to-Cu) direct bonding (a technique for achieving electrical continuity by connecting copper (Cu) pads).

[Display Panel 200C]

Figure 17:
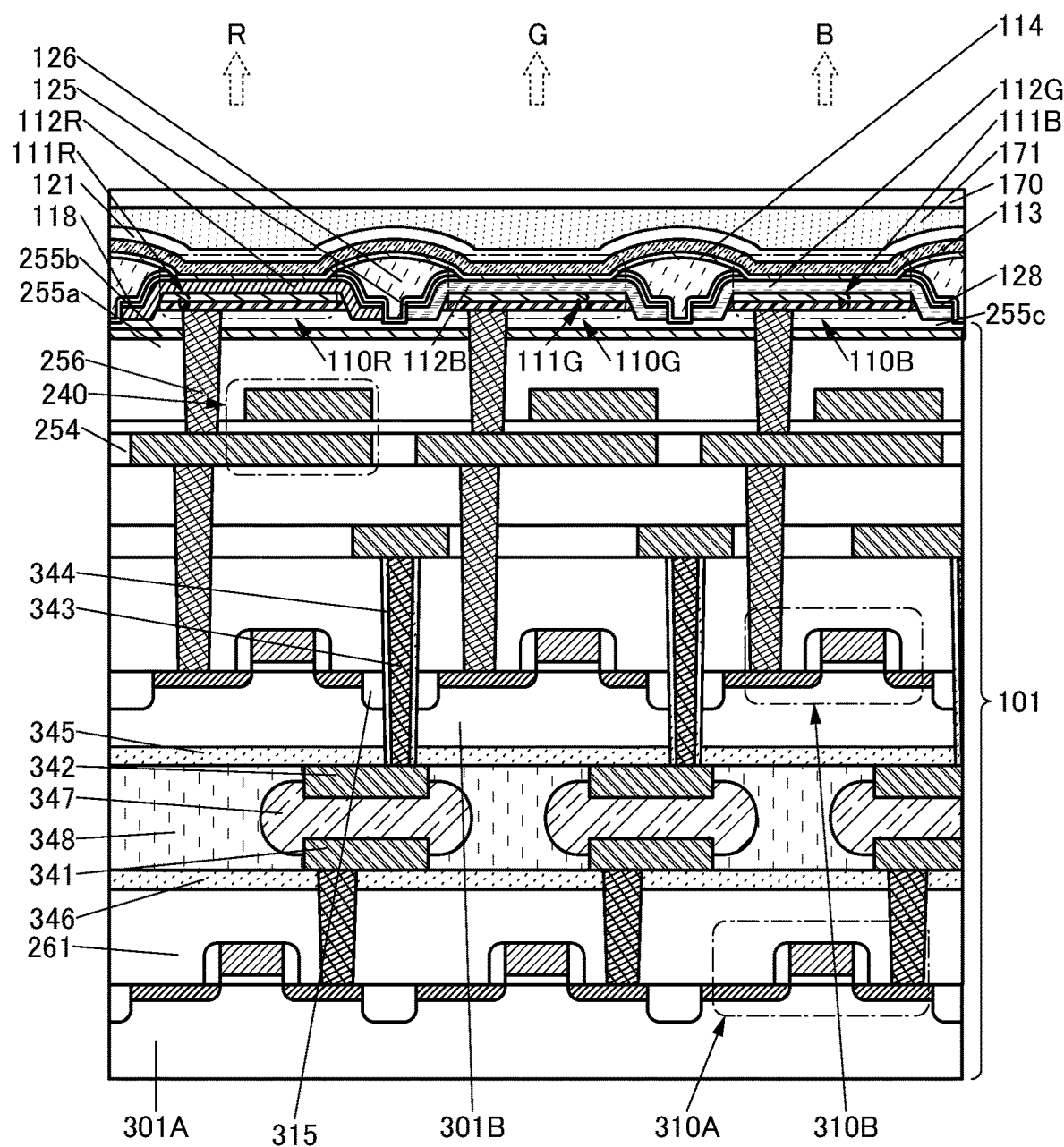
FIG. 17 illustrates a structure example of a display panel.

The display panel 200C illustrated in FIG. 17 has a structure in which the conductive layer 341 and the conductive layer 342 are bonded to each other with a bump 347.

As illustrated in FIG. 17, providing the bump 347 between the conductive layer 341 and the conductive layer 342 enables the conductive layers 341 and 342 to be electrically connected to each other. The bump 347 can be formed using a conductive material containing gold (Au), nickel (Ni), indium (In), tin (Sn), or the like, for example. As another example, solder may be used for the bump 347. An adhesive layer 348 may be provided between the insulating layer 345 and the insulating layer 346. In the case where the bump 347 is provided, the insulating layer 335 and the insulating layer 336 may be omitted.

[Display Panel 200D]

Figure 18:
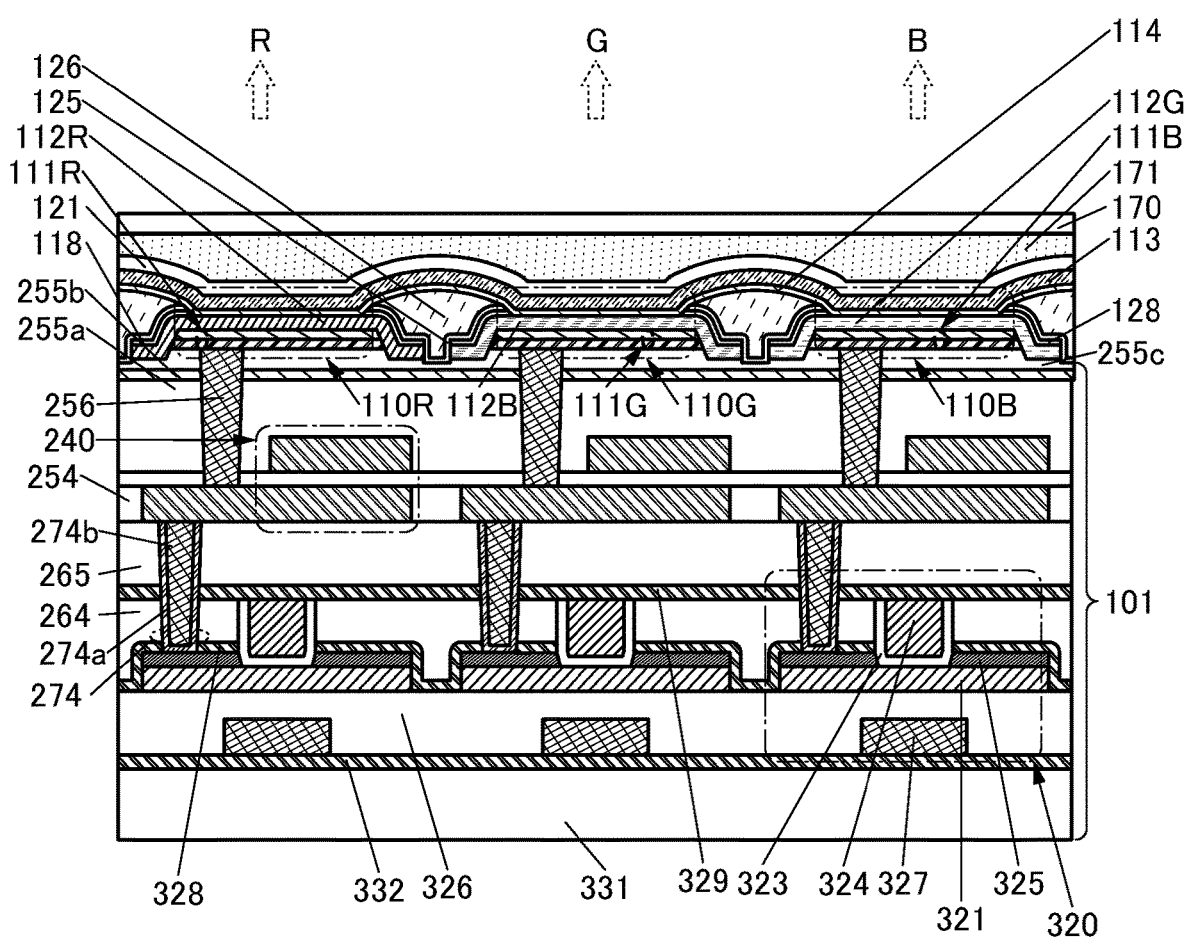
FIG. 18 illustrates a structure example of a display panel.

The display panel 200D illustrated in FIG. 18 differs from the display panel 200A mainly in a structure of a transistor.

A transistor 320 is a transistor that contains a metal oxide (also referred to as an oxide semiconductor) in a semiconductor layer where a channel is formed (i.e., an OS transistor).

The transistor 320 includes a semiconductor layer 321, an insulating layer 323, a conductive layer 324, a pair of conductive layers 325, an insulating layer 326, and a conductive layer 327.

A insulating layer 331 corresponds to the substrate 291 in FIGS. 14A and 14B.

An insulating layer 332 is provided over the insulating layer 331. The insulating layer 332 functions as a barrier layer that prevents diffusion of impurities such as water or hydrogen from the insulating layer 331 into the transistor 320 and release of oxygen from the semiconductor layer 321 to the insulating layer 332 side. As the insulating layer 332, for example, a film in which hydrogen or oxygen is less likely to diffuse than in a silicon oxide film, such as an aluminum oxide film, a hafnium oxide film, or a silicon nitride film can be used.

The conductive layer 327 is provided over the insulating layer 332, and the insulating layer 326 is provided to cover the conductive layer 327. The conductive layer 327 functions as a first gate electrode of the transistor 320, and part of the insulating layer 326 functions as a first gate insulating layer. An oxide insulating film such as a silicon oxide film is preferably used for at least part of the insulating layer 326 that is in contact with the semiconductor layer 321. The top surface of the insulating layer 326 is preferably planarized.

The semiconductor layer 321 is provided over the insulating layer 326. A metal oxide film having semiconductor characteristics (also referred to as an oxide semiconductor film) is preferably used as the semiconductor layer 321. The pair of conductive layers 325 is provided on and in contact with the semiconductor layer 321, and functions as a source electrode and a drain electrode.

An insulating layer 328 is provided to cover the top and side surfaces of the pair of conductive layers 325, the side surface of the semiconductor layer 321, and the like, and an insulating layer 264 is provided over the insulating layer 328. The insulating layer 328 functions as a barrier layer that prevents diffusion of impurities such as water or hydrogen from the insulating layer 264 and the like into the semiconductor layer 321 and release of oxygen from the semiconductor layer 321. As the insulating layer 328, an insulating film similar to the insulating layer 332 can be used.

An opening reaching the semiconductor layer 321 is provided in the insulating layers 328 and 264. The insulating layer 323 that is in contact with the top surface of the semiconductor layer 321 and the conductive layer 324 are embedded in the opening. The conductive layer 324 functions as a second gate electrode, and the insulating layer 323 functions as a second gate insulating layer.

The top surface of the conductive layer 324, the top surface of the insulating layer 323, and the top surface of the insulating layer 264 are planarized so that they are level with or substantially level with each other, and insulating layers 329 and 265 are provided to cover these layers.

The insulating layers 264 and 265 each function as an interlayer insulating layer. The insulating layer 329 functions as a barrier layer that prevents diffusion of impurities such as water or hydrogen from the insulating layer 265 and the like into the transistor 320. As the insulating layer 329, an insulating film similar to the insulating layers 328 and 332 can be used.

A plug 274 electrically connected to one of the pair of conductive layers 325 is provided to be embedded in the insulating layers 265, 329, and 264. Here, the plug 274 preferably includes a conductive layer 274a that covers the side surface of an opening formed in the insulating layers 265, 329, 264, and 328 and part of the top surface of the conductive layer 325, and a conductive layer 274b in contact with the top surface of the conductive layer 274a. For the conductive layer 274a, a conductive material in which hydrogen and oxygen are less likely to diffuse is preferably used.

There is no particular limitation on the structure of the transistors included in the display panel of this embodiment. For example, a planar transistor, a staggered transistor, or an inverted staggered transistor can be used. A top-gate transistor or a bottom-gate transistor can be used. Gates may be provided above and below a semiconductor layer where a channel is formed.

The structure in which the semiconductor layer where a channel is formed is provided between two gates is used for the transistor 320. The two gates may be connected to each other and supplied with the same signal to operate the transistor. Alternatively, the threshold voltage of the transistor may be controlled by applying a potential for controlling the threshold voltage to one of the two gates and a potential for driving to the other of the two gates.

There is no particular limitation on the crystallinity of a semiconductor material used in the semiconductor layer of the transistor, and an amorphous semiconductor, a single crystal semiconductor, or a semiconductor having crystallinity other than single crystal (a microcrystalline semiconductor, a polycrystalline semiconductor, or a semiconductor partly including crystal regions) can be used. It is preferable to use a single crystal semiconductor or a semiconductor having crystallinity, in which case deterioration of the transistor characteristics can be suppressed.

The band gap of a metal oxide included in the semiconductor layer of the transistor is preferably 2 eV or more, further preferably 2.5 eV or more. The use of such a metal oxide having a wide band gap can reduce the off-state current of the OS transistor.

A metal oxide preferably contains at least indium or zinc, and further preferably contains indium and zinc. A metal oxide preferably contains indium, M (M is one or more of gallium, aluminum, yttrium, tin, silicon, boron, copper, vanadium, beryllium, titanium, iron, nickel, germanium, zirconium, molybdenum, lanthanum, cerium, neodymium, hafnium, tantalum, tungsten, magnesium, and cobalt), and zinc, for example.

Alternatively, a semiconductor layer of a transistor may contain silicon. Examples of silicon include amorphous silicon and crystalline silicon (e.g., low-temperature polysilicon or single crystal silicon).

Examples of the metal oxide that can be used for the semiconductor layer include indium oxide, gallium oxide, and zinc oxide. The metal oxide preferably contain two or three kinds selected from indium, the element M, and zinc.

The element M is one or more of gallium, aluminum, silicon, boron, yttrium, tin, copper, vanadium, beryllium, titanium, iron, nickel, germanium, zirconium, molybdenum, lanthanum, cerium, neodymium, hafnium, tantalum, tungsten, and magnesium. Specifically, the element M is preferably one or more of aluminum, gallium, yttrium, and tin.

It is particularly preferable that an oxide containing indium, gallium, and zinc (also referred to as IGZO) be used as the metal oxide used for the semiconductor layer. Alternatively, it is preferable to use an oxide containing indium, tin, and zinc (also referred to as ITZO (registered trademark)). Alternatively, it is preferable to use an oxide containing indium, gallium, tin, and zinc. Alternatively, it is preferable to use an oxide containing indium, aluminum, and zinc (also referred to as IAZO). Alternatively, it is preferable to use an oxide containing indium, aluminum, gallium, and zinc (also referred to as IAGZO).

When the metal oxide used for the semiconductor layer is an In-M-Zn oxide, the atomic ratio of In is preferably greater than or equal to the atomic ratio of M in the In-M-Zn oxide. Examples of the atomic ratio of the metal elements in such an In-M-Zn oxide are In:M:Zn=1:1:1, 1:1:1.2, 1:3:2, 1:3:4, 2:1:3, 3:1:2, 4:2:3, 4:2:4.1, 5:1:3, 5:1:6, 5:1:7, 5:1:8, 6:1:6, and 5:2:5 and a composition in the vicinity of any of the above atomic ratios. Note that the vicinity of the atomic ratio includes ±30% of an intended atomic ratio.

For example, when the atomic ratio is described as In:Ga:Zn=4:2:3 or a composition in the vicinity thereof, the case is included where the atomic ratio of Ga is greater than or equal to 1 and less than or equal to 3 and the atomic ratio of Zn is greater than or equal to 2 and less than or equal to 4 with the atomic ratio of In being 4. In addition, when the atomic ratio is described as In:Ga:Zn=5:1:6 or a composition in the vicinity thereof, the case is included where the atomic ratio of Ga is greater than 0.1 and less than or equal to 2 and the atomic ratio of Zn is greater than or equal to 5 and less than or equal to 7 with the atomic ratio of In being 5. Furthermore, when the atomic ratio is described as In:Ga:Zn=1:1:1 or a composition in the vicinity thereof, the case is included where the atomic ratio of Ga is greater than 0.1 and less than or equal to 2 and the atomic ratio of Zn is greater than 0.1 and less than or equal to 2 with the atomic ratio of In being 1.

The semiconductor layer may include two or more metal oxide layers having different compositions. For example, a stacked structure of a first metal oxide layer having In:M:Zn=1:3:4 [atomic ratio] or a composition in the vicinity thereof and a second metal oxide layer having In:M:Zn=1:1:1 [atomic ratio] or a composition in the vicinity thereof and being formed over the first metal oxide layer can be favorably employed. In particular, gallium or aluminum is preferably used as the element M.

Alternatively, a stacked structure of one selected from indium oxide, indium gallium oxide, and IGZO, and one selected from IAZO, IAGZO, and ITZO (registered trademark) may be employed, for example.

As the oxide semiconductor having crystallinity, a c-axis aligned crystalline oxide semiconductor (CAAC-OS), a nanocrystalline oxide semiconductor (nc-OS), and the like are given.

The OS transistor has much higher field-effect mobility than a transistor containing amorphous silicon. In addition, the OS transistor has an extremely low leakage current between a source and a drain in an off state (the leakage current is hereinafter also referred to as an off-state current), and charge accumulated in a capacitor that is connected in series to the transistor can be held for a long period. Furthermore, the power consumption of the display panel can be reduced with the OS transistor.

To increase the emission luminance of the light-emitting device included in a pixel circuit, it is necessary to increase the amount of current flowing through the light-emitting device. For this, it is necessary to increase the source-drain voltage of a driving transistor included in the pixel circuit. Since the OS transistor has a higher withstand voltage between the source and the drain than a Si transistor, a high voltage can be applied between the source and the drain of the OS transistor. Thus, with the use of an OS transistor as a driving transistor included in the pixel circuit, the amount of current flowing through the light-emitting device can be increased, resulting in an increase in emission luminance of the light-emitting device.

Assuming that the transistor operates in a saturation region, a change in the amount of current between the source and the drain, with respect to a fluctuation in the gate-source voltage, in the OS transistor is smaller than that in the Si transistor. Thus, with the use of an OS transistor as a driving transistor included in the pixel circuit, the amount of current flowing between the source and the drain can be accurately specified based on a fluctuation of the gate-source voltage, which enables the amount of current flowing through the light-emitting device to be controlled. Accordingly, the gray level in the pixel circuit can be increased.

As saturation characteristics of current flowing when the transistor operates in a saturation region, the OS transistor can make current (saturation current) flow more stably than the Si transistor even when the source-drain voltage gradually increases. Thus, with the use of an OS transistor as a driving transistor, current can be made to flow stably through the light-emitting device, for example, even when a variation in current-voltage characteristics of the EL device occurs. In other words, the amount of current between the source and the drain is less changed in the OS transistor operating in the saturation region even when the source-drain voltage is made higher. As a result, the emission luminance of the light-emitting device can be stabilized.

As described above, with the use of an OS transistor as a driving transistor included in the pixel circuit, it is possible to achieve "reduction in power consumption", "increase in emission luminance", "increase in gray level", "inhibition of variation in light-emitting devices", and the like.

[Display Panel 200E]

Figure 19:
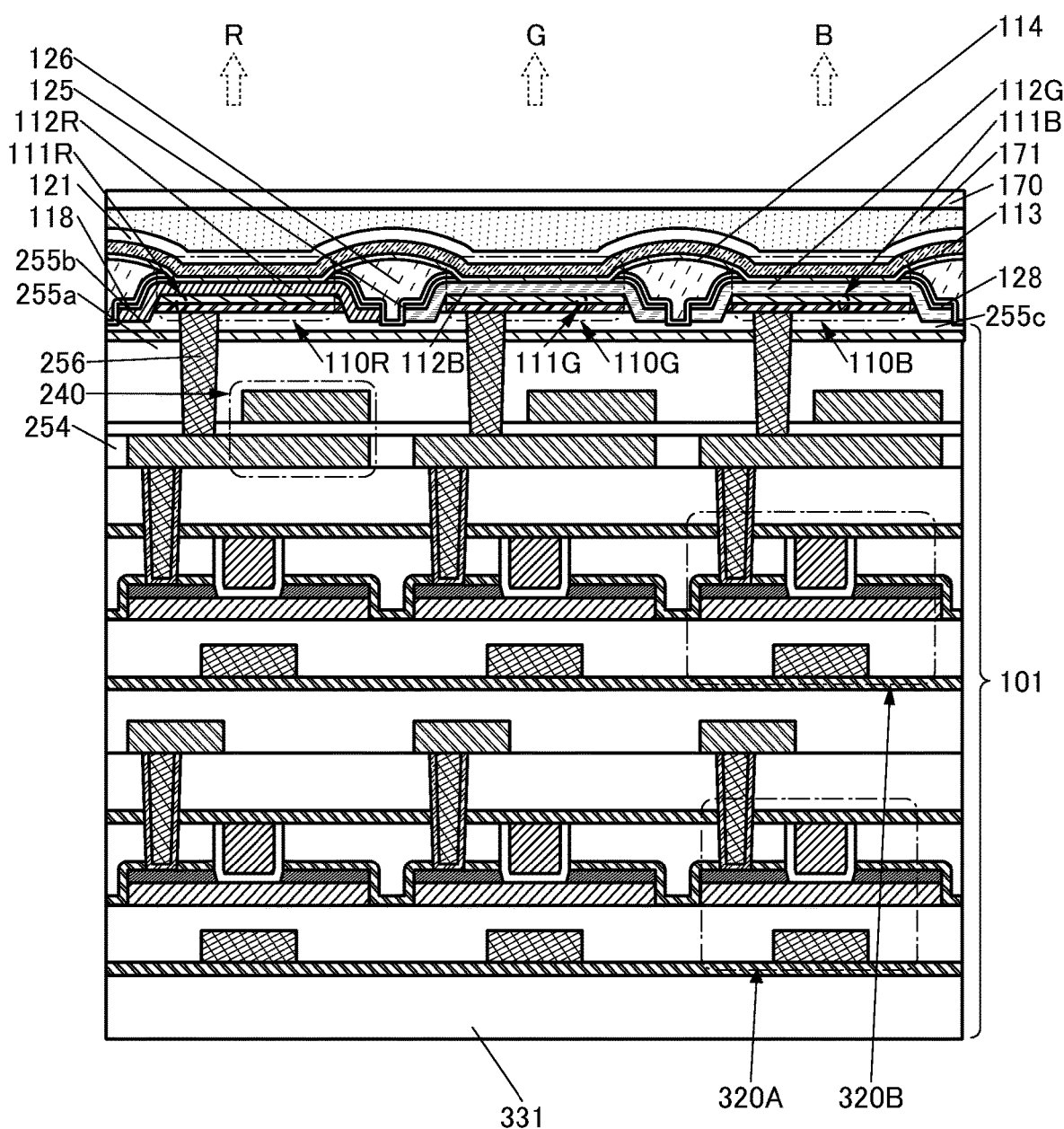
FIG. 19 illustrates a structure example of a display panel.

The display panel 200E illustrated in FIG. 19 has a structure in which a transistor 320A and a transistor 320B each including an oxide semiconductor in a semiconductor where a channel is formed are stacked.

The description of the display panel 200D can be referred to for the transistor 320A, the transistor 320B, and other peripheral structures.

Although the structure in which two transistors including an oxide semiconductor are stacked is described, the present invention is not limited thereto. For example, three or more transistors may be stacked.

[Display Panel 200F]

Figure 20:
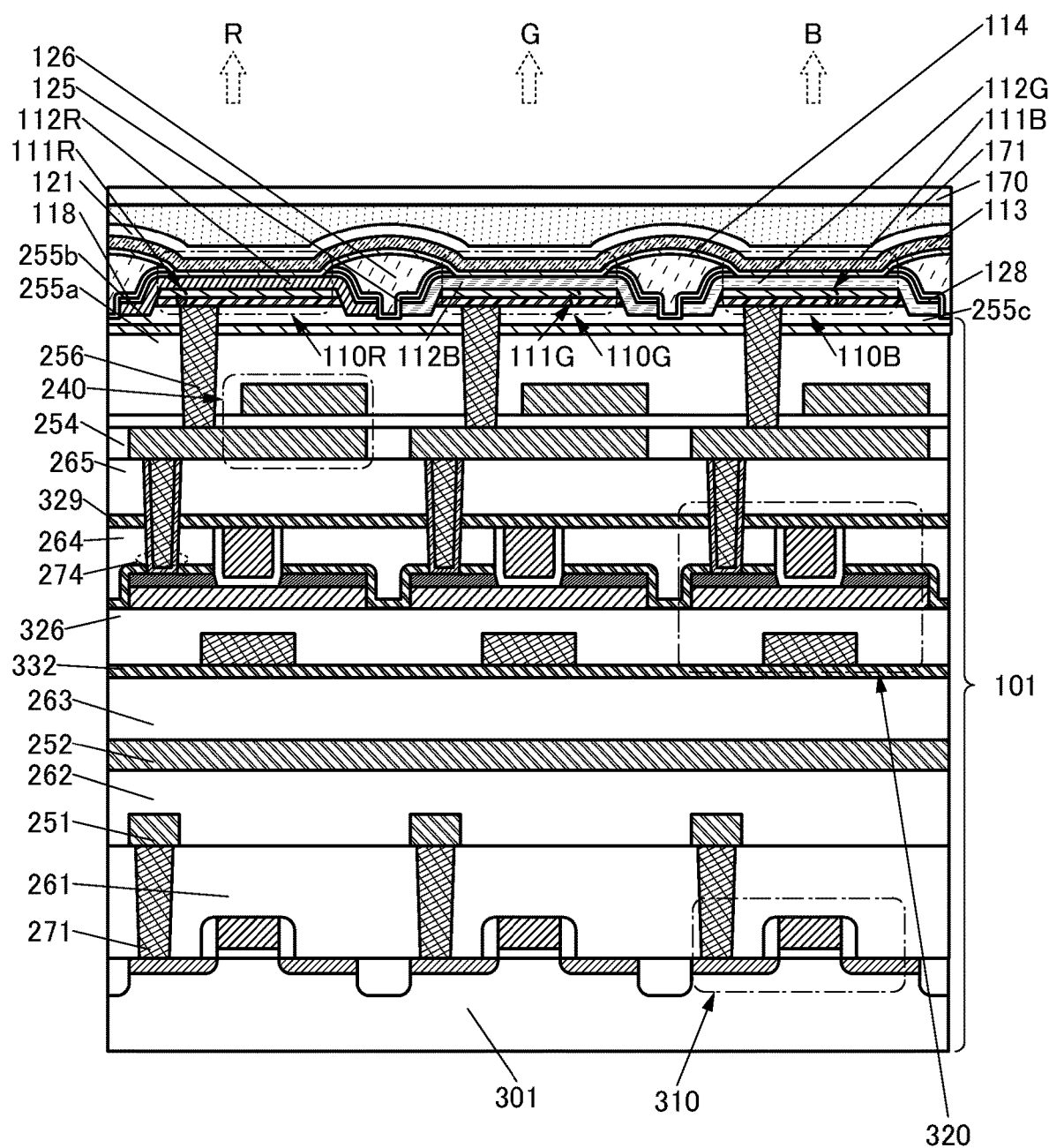
FIG. 20 illustrates a structure example of a display panel.

The display panel 200F illustrated in FIG. 20 has a structure in which the transistor 310 having a channel formed in the substrate 301 and the transistor 320 including a metal oxide in a semiconductor layer where a channel is formed are stacked.

The insulating layer 261 is provided to cover the transistor 310, and a conductive layer 251 is provided over the insulating layer 261. An insulating layer 262 is provided to cover the conductive layer 251, and a conductive layer 252 is provided over the insulating layer 262. The conductive layer 251 and the conductive layer 252 each function as a wiring. An insulating layer 263 and the insulating layer 332 are provided to cover the conductive layer 252, and the transistor 320 is provided over the insulating layer 332. The insulating layer 265 is provided to cover the transistor 320, and the capacitor 240 is provided over the insulating layer 265. The capacitor 240 and the transistor 320 are electrically connected to each other through the plug 274.

The transistor 320 can be used as a transistor included in the pixel circuit. The transistor 310 can be used as a transistor included in the pixel circuit or a transistor included in a driver circuit for driving the pixel circuit (a gate line driver circuit or a source line driver circuit). The transistor 310 and the transistor 320 can also be used as transistors included in a variety of circuits such as an arithmetic circuit and a memory circuit.

With such a structure, not only the pixel circuit but also the driver circuit and the like can be formed directly under the light-emitting devices; thus, the display panel can be downsized as compared with the case where a driver circuit is provided around a display region.

[Display Panel 200G]

Figure 21:
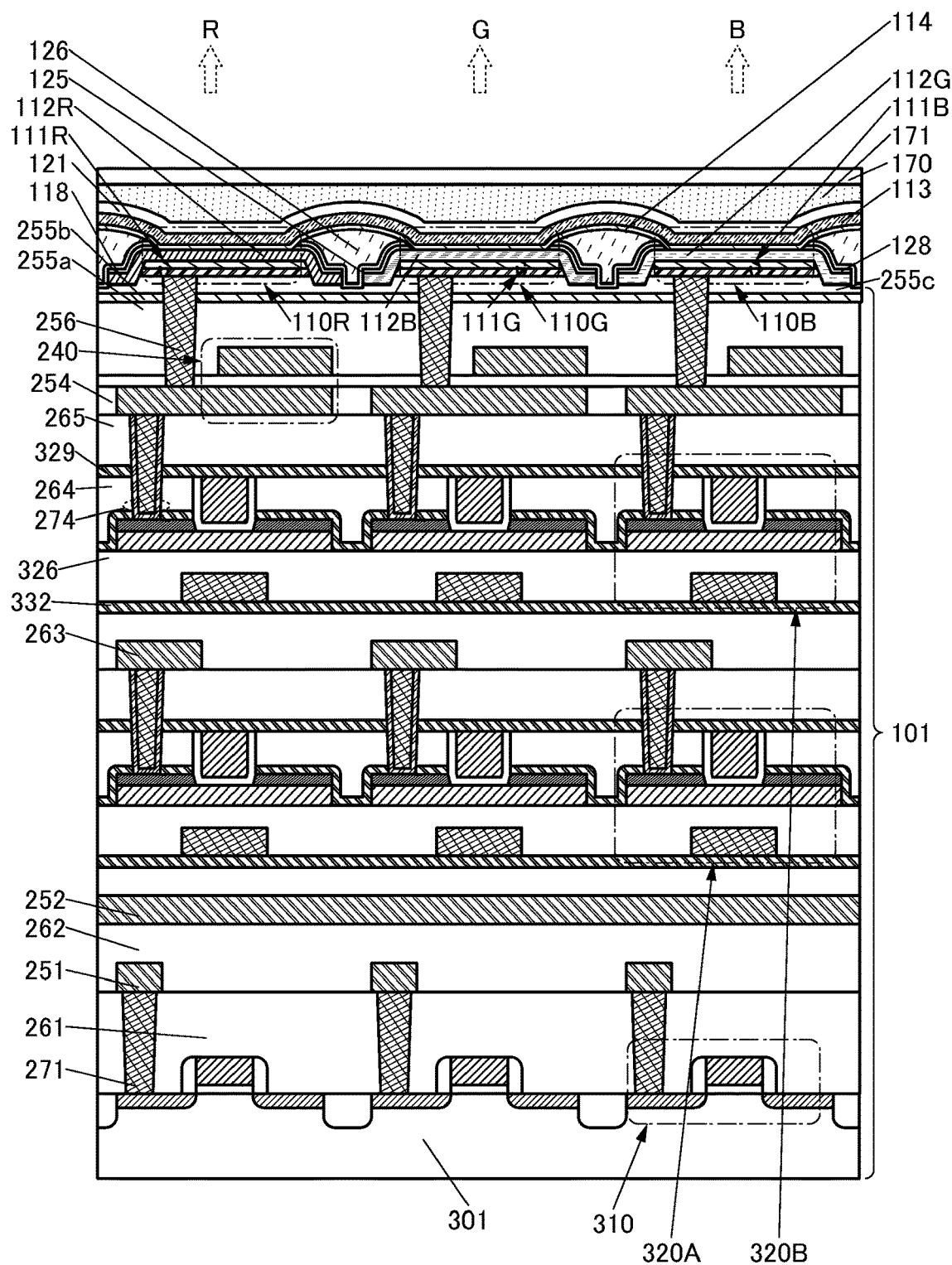
FIG. 21 illustrates a structure example of a display panel.

The display panel 200G illustrated in FIG. 21 has a structure in which the transistor 310 having a channel formed in the substrate 301 and the transistors 320A and 320B each including a metal oxide in a semiconductor layer where a channel is formed are stacked.

The transistor 320A can be used as a transistor included in the pixel circuit. The transistor 310 can be used as a transistor included in the pixel circuit or a transistor included in a driver circuit for driving the pixel circuit (a gate line driver circuit or a source line driver circuit). The transistor 320B may be used as a transistor included in the pixel circuit or a transistor included in the driver circuit. The transistor 310, the transistor 320A, and the transistor 320B can also be used as transistors included in a variety of circuits such as an arithmetic circuit and a memory circuit.

At least part of this embodiment can be implemented in combination with any of the other embodiments described in this specification, as appropriate.

Embodiment 4

In this embodiment, a light-emitting device that can be used in the display panel of one embodiment of the present invention will be described.

In this specification and the like, a device formed using a metal mask or a fine metal mask (FMM) is sometimes referred to as a device having a metal mask (MM) structure. In this specification and the like, a device formed without using a metal mask or an FMM is sometimes referred to as a device having a metal maskless (MML) structure.

In this specification and the like, a structure in which at least light-emitting layers of light-emitting devices with different emission wavelengths are separately formed may be referred to as a side-by-side (SBS) structure. The SBS structure can optimize materials and structures of light-emitting devices and thus can extend freedom of choice of materials and structures, whereby the luminance and the reliability can be easily improved.

In this specification and the like, a hole or an electron is sometimes referred to as a carrier. Specifically, a hole-injection layer or an electron-injection layer may be referred to as a carrier-injection layer, a hole-transport layer or an electron-transport layer may be referred to as a carrier-transport layer, and a hole-blocking layer or an electron-blocking layer may be referred to as a carrier-blocking layer.

Note that the above-described carrier-injection layer, carrier-transport layer, and carrier-blocking layer cannot be distinguished from each other depending on the cross-sectional shape or properties in some cases. One layer may have two or three functions of the carrier-injection layer, the carrier-transport layer, and the carrier-blocking layer in some cases.

In this specification and the like, a light-emitting device includes an EL layer between a pair of electrodes. The EL layer includes at least a light-emitting layer. Examples of layers (also referred to as functional layers) in the EL layer include a light-emitting layer, carrier-injection layers (a hole-injection layer and an electron-injection layer), carrier-transport layers (a hole-transport layer and an electron-transport layer), and carrier-blocking layers (a hole-blocking layer and an electron-blocking layer).

As the light-emitting device, an organic light-emitting diode (OLED) or a quantum-dot light-emitting diode (QLED) is preferably used, for example. Examples of a light-emitting substance contained in the light-emitting device include a substance exhibiting fluorescence (fluorescent material), a substance exhibiting phosphorescence (phosphorescent material), a substance exhibiting thermally activated delayed fluorescence (thermally activated delayed fluorescent (TADF) material), and an inorganic compound (e.g., a quantum dot material). A light-emitting diode (LED) such as a micro-LED can also be used as the light-emitting device.

The light-emitting device can emit infrared, red, green, blue, cyan, magenta, yellow, or white light, for example. When the light-emitting device has a microcavity structure, the color purity can be increased.

Figure 22A:
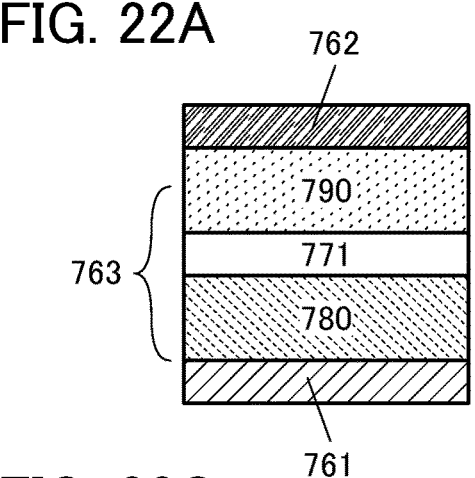
FIGS. 22A to 22F each illustrate a structure example of a light-emitting device.

As illustrated in FIG. 22A, the light-emitting device includes an EL layer 763 between a pair of electrodes (a lower electrode 761 and an upper electrode 762). The EL layer 763 can be formed of a plurality of layers such as a layer 780, a light-emitting layer 771, and a layer 790.

The light-emitting layer 771 contains at least a light-emitting substance (also referred to as a light-emitting material).

In the case where the lower electrode 761 is an anode and the upper electrode 762 is a cathode, the layer 780 includes one or more of a layer containing a substance having a high hole-injection property (hole-injection layer), a layer containing a substance having a high hole-transport property (hole-transport layer), and a layer containing a substance having a high electron-blocking property (electron-blocking layer). Furthermore, the layer 790 includes one or more of a layer containing a substance having a high electron-injection property (electron-injection layer), a layer containing a substance having a high electron-transport property (electron-transport layer), and a layer containing a substance having a high hole-blocking property (hole-blocking layer). In the case where the lower electrode 761 is a cathode and the upper electrode 762 is an anode, the structures of the layer 780 and the layer 790 are interchanged.

The structure including the layer 780, the light-emitting layer 771, and the layer 790, which is provided between the pair of electrodes, can function as a single light-emitting unit, and the structure in FIG. 22A is referred to as a single structure in this specification.

Figure 22B:
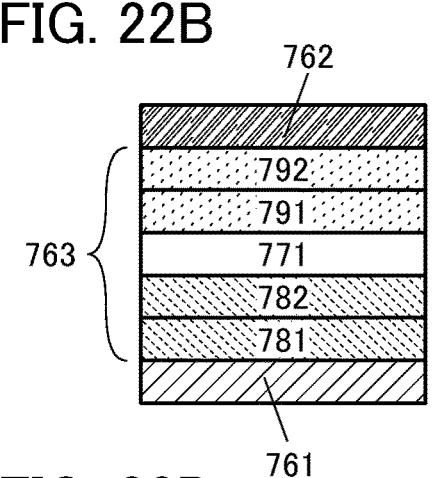

FIG. 22B is a modification example of the EL layer 763 included in the light-emitting device illustrated in FIG. 22A. Specifically, the light-emitting device illustrated in FIG. 22B includes a layer 781 over the lower electrode 761, a layer 782 over the layer 781, the light-emitting layer 771 over the layer 782, a layer 791 over the light-emitting layer 771, a layer 792 over the layer 791, and the upper electrode 762 over the layer 792.

In the case where the lower electrode 761 is an anode and the upper electrode 762 is a cathode, the layer 781 can be a hole-injection layer, the layer 782 can be a hole-transport layer, the layer 791 can be an electron-transport layer, and the layer 792 can be an electron-injection layer, for example. In the case where the lower electrode 761 is a cathode and the upper electrode 762 is an anode, the layer 781 can be an electron-injection layer, the layer 782 can be an electron-transport layer, the layer 791 can be a hole-transport layer, and the layer 792 can be a hole-injection layer. With such a layered structure, carriers can be efficiently injected to the light-emitting layer 771, and the efficiency of the recombination of carriers in the light-emitting layer 771 can be enhanced.

Figure 22C:
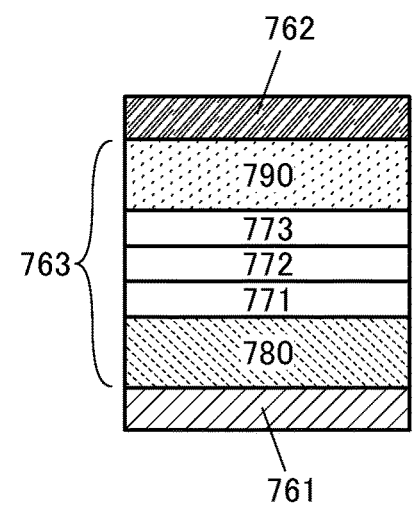
Figure 22D:
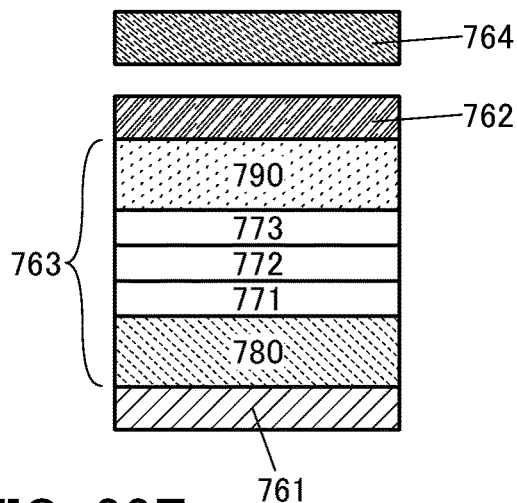

Note that structures in which a plurality of light-emitting layers (light-emitting layers 771, 772, and 773) are provided between the layers 780 and 790 as illustrated in FIGS. 22C and 22D are other variations of the single structure. Although FIGS. 22C and 22D each illustrate an example in which three light-emitting layers are included, the number of light-emitting layers in a light-emitting device having a single structure may be two or four or more. A light-emitting device having a single structure may include a buffer layer between two light-emitting layers.

Figure 22E:
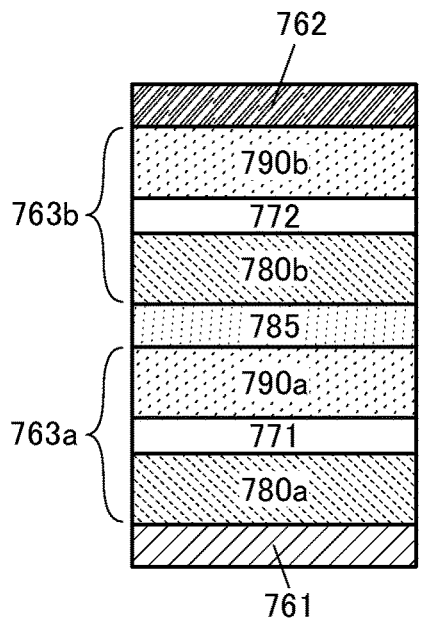
Figure 22F:
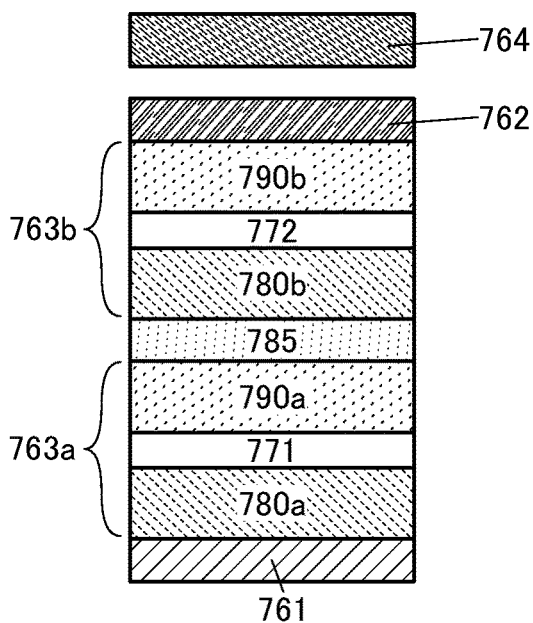

A structure in which a plurality of light-emitting units (light-emitting units 763*a* and 763*b*) are connected in series with a charge-generation layer (also referred to as an intermediate layer) 785 therebetween as illustrated in FIGS. 22E and 22F is referred to as a tandem structure in this specification. The tandem structure may be referred to as a stack structure. The tandem structure enables a light-emitting device capable of high-luminance light emission. Furthermore, the tandem structure allows the amount of current needed for obtaining the same luminance to be reduced as compared to the case of using a single structure, and thus can improve the reliability.

Note that FIGS. 22D and 22F each illustrate an example in which the display panel includes a layer 764 overlapping with the light-emitting device. FIG. 22D is an example in which the layer 764 overlaps with the light-emitting device illustrated in FIG. 22C and FIG. 22F illustrates an example in which the layer 764 overlaps with the light-emitting device illustrated in FIG. 22E.

One or both of a color conversion layer and a color filter (coloring layer) can be used as the layer 764.

In FIGS. 22C and 22D, light-emitting substances that emit light of the same color or the same light-emitting substance may be used for the light-emitting layers 771, 772, and 773. For example, a light-emitting substance that emits blue light may be used for the light-emitting layers 771, 772, and 773. In a subpixel that emits blue light, blue light from the light-emitting device can be extracted as it is. In each of a subpixel that emits red light and a subpixel that emits green light, a color conversion layer is provided as the layer 764 illustrated in FIG. 22D for converting blue light from the light-emitting device into light with a longer wavelength, so that red light or green light can be extracted.

Alternatively, light-emitting substances that emit light of different colors may be used for the light-emitting layers 771, 772, and 773. White light can be obtained when the light-emitting layer 771, the light-emitting layer 772, and the light-emitting layer 773 emit light of complementary colors. The light-emitting device having a single structure preferably includes a light-emitting layer containing a light-emitting substance emitting blue light and a light-emitting layer containing a light-emitting substance emitting visible light with a longer wavelength than blue light, for example.

In the case where the light-emitting device having a single structure includes three light-emitting layers, for example, a light-emitting layer containing a light-emitting substance emitting red (R) light, a light-emitting layer containing a light-emitting substance emitting green (G) light, and a light-emitting layer containing a light-emitting substance emitting blue (B) light are preferably included. The stacking order of the light-emitting layers can be RGB or RBG from an anode side, for example. In that case, a buffer layer may be provided between R and G or between R and B.

In the case where the light-emitting device having a single structure includes two light-emitting layers, for example, a light-emitting layer containing a light-emitting substance emitting blue (B) light and a light-emitting layer containing a light-emitting substance emitting yellow (Y) light are preferably included. Such a structure may be referred to as a BY single structure.

A color filter may be provided as the layer 764 illustrated in FIG. 22D. When white light passes through a color filter, light of a desired color can be obtained.

In the light-emitting device that emits white light, two or more kinds of light-emitting substances are preferably contained. To obtain white light emission, the two or more kinds of light-emitting substances are selected so as to emit light of complementary colors. For example, when emission colors of a first light-emitting layer and a second light-emitting layer are complementary colors, the light-emitting device can emit white light as a whole. The same applies to a light-emitting device including three or more light-emitting layers.

In FIGS. 22E and 22F, light-emitting substances that emit light of the same color or the same light-emitting substance may be used for the light-emitting layers 771 and 772.

For example, in light-emitting devices included in subpixels emitting light of different colors, a light-emitting substance that emits blue light can be used for each of the light-emitting layer 771 and the light-emitting layer 772. In the subpixel that emits blue light, blue light from the light-emitting device can be extracted as it is. In each of the subpixel that emits red light and the subpixel that emits green light, a color conversion layer is provided as the layer 764 illustrated in FIG. 22F for converting blue light from the light-emitting device into light with a longer wavelength, so that red light or green light can be extracted.

In the case where light-emitting devices with the structure illustrated in FIG. 22E or FIG. 22F are used in subpixels emitting light of different colors, light-emitting substances may be different between the subpixels. Specifically, in the light-emitting device included in the subpixel emitting red light, a light-emitting substance that emits red light can be used for each of the light-emitting layer 771 and the light-emitting layer 772. In the light-emitting device included in the subpixel emitting green light, a light-emitting substance that emits green light can be used for each of the light-emitting layer 771 and the light-emitting layer 772. In the light-emitting device included in the subpixel emitting blue light, a light-emitting substance that emits blue light can be used for each of the light-emitting layer 771 and the light-emitting layer 772. A display panel with such a structure includes a light-emitting device with a tandem structure and can be regarded to have an SBS structure. Thus, the display panel can have advantages of both of a tandem structure and an SBS structure. Accordingly, a highly reliable light-emitting device capable of high luminance light emission can be obtained.

In FIGS. 22E and 22F, light-emitting substances that emit light of different colors may be used for the light-emitting layers 771 and 772. White light can be obtained when the light-emitting layer 771 and the light-emitting layer 772 emit light of complementary colors. A color filter may be provided as the layer 764 illustrated in FIG. 22F. When white light passes through a color filter, light of a desired color can be obtained.

Although FIGS. 22E and 22F each illustrate an example in which the light-emitting unit 763a includes one light-emitting layer 771 and the light-emitting unit 763b includes one light-emitting layer 772, one embodiment of the present invention is not limited thereto. Each of the light-emitting unit 763a and the light-emitting unit 763b may include two or more light-emitting layers.

Although FIGS. 22E and 22F each illustrate an example of a light-emitting device including two light-emitting units, one embodiment of the present invention is not limited thereto. The light-emitting device may include three or more light-emitting units.

Figure 23A:
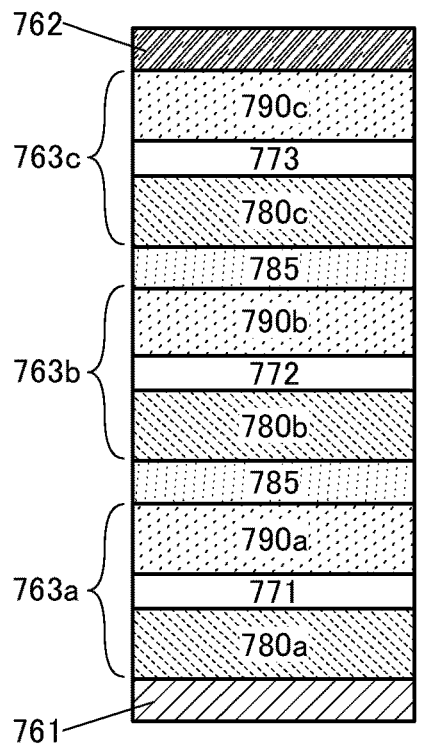
FIGS. 23A to 23C each illustrate a structure example of a light-emitting device.
Figure 23B:
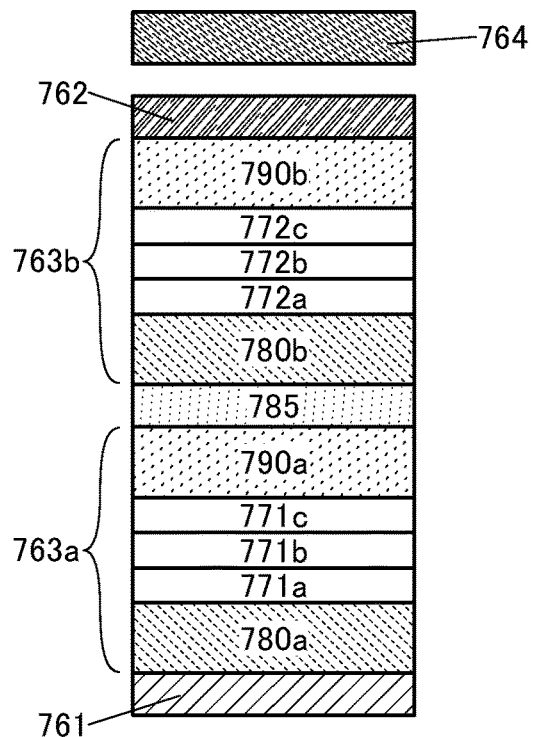
Figure 23C:
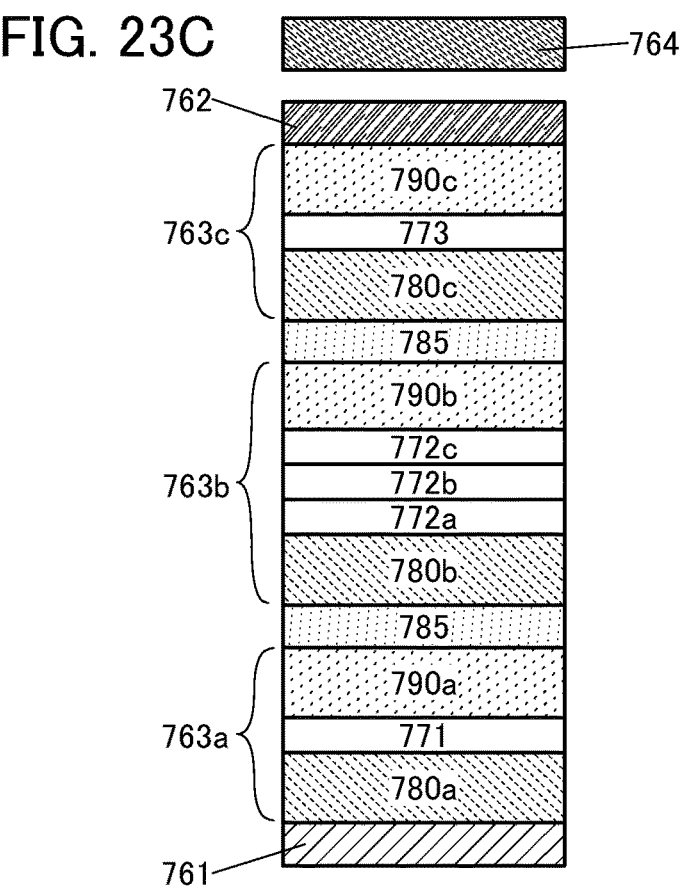

Specifically, the light-emitting device may have any of structures illustrated in FIGS. 23A to 23C.

FIG. 23A illustrates a structure including three light-emitting units. Note that a structure including two light-emitting units and a structure including three light-emitting units may be referred to as a two-unit tandem structure and a three-unit tandem structure, respectively.

In the structure illustrated in FIG. 23A, a plurality of light-emitting units (light-emitting units 763a, 763b, and 763c) are connected in series with the charge-generation layer 785 provided between each two light-emitting units. The light-emitting unit 763a includes a layer 780a, the light-emitting layer 771, and a layer 790a. The light-emitting unit 763b includes a layer 780b, the light-emitting layer 772, and a layer 790b. The light-emitting unit 763c includes a layer 780c, the light-emitting layer 773, and a layer 790c.

Note that in the structure illustrated in FIG. 23A, the light-emitting layers 771, 772, and 773 preferably contain light-emitting substances that emit light of the same color. Specifically, a structure in which the light-emitting layers 771, 772, and 773 each contain a red (R) light-emitting substance (what is called a three-unit tandem structure of R\R\R), a structure in which the light-emitting layers 771, 772, and 773 each contain a green (G) light-emitting substance (what is called a three-unit tandem structure of G\G\G), or a structure in which the light-emitting layers 771, 772, and 773 each contain a blue (B) light-emitting substance (what is called a three-unit tandem structure of B\B\B) can be employed.

Note that the structure containing the light-emitting substances that emit light of the same color is not limited to the above structure. For example, a light-emitting device with a tandem structure may be employed in which light-emitting units each containing a plurality of light-emitting substances are stacked as illustrated in FIG. 23B. FIG. 23B illustrates a structure in which a plurality of light-emitting units (light-emitting units 763a and 763b) are connected in series with the charge-generation layer 785 therebetween. The light-emitting unit 763a includes the layer 780a, a light-emitting layer 771a, a light-emitting layer 771b, a light-emitting layer 771c, and the layer 790a. The light-emitting unit 763b includes the layer 780b, a light-emitting layer 772a, a light-emitting layer 772b, a light-emitting layer 772c, and the layer 790b.

In the structure illustrated in FIG. 23B, light-emitting substances for the light-emitting layers 771a, 771b, and 771c are selected so as to emit light of complementary colors to obtain white (W) light emission. Furthermore, light-emitting substances for the light-emitting layers 772a, 772b, and 772c are selected so as to emit light of complementary colors to obtain white (W) light emission. That is, the structure illustrated in FIG. 23B is a two-unit tandem structure of W\W. Note that there is no particular limitation on the stacking order of the light-emitting layers 771a, 771b, and 771c containing light-emitting substances that emit light of complementary colors, and a practitioner can select an optimum stacking order as appropriate. Although not illustrated, a three-unit tandem structure of W\W\W or a tandem structure with four or more units may be employed.

In the case of a light-emitting device with a tandem structure, any of the following structure may be employed, for example: a two-unit tandem structure of B\Y including a light-emitting unit that emits yellow (Y) light and a light-emitting unit that emits blue (B) light; a two-unit tandem structure of RG\B including a light-emitting unit that emits red (R) and green (G) light and a light-emitting unit that emits blue (B) light; a three-unit tandem structure of B\Y\B including a light-emitting unit that emits blue (B) light, a light-emitting unit that emits yellow (Y) light, and a light-emitting unit that emits blue (B) light in this order; a three-unit tandem structure of B\YG\B including a light-emitting unit that emits blue (B) light, a light-emitting unit that emits yellow-green (YG) light, and a light-emitting unit that emits blue (B) light in this order; and a three-unit tandem structure of B\G\B including a light-emitting unit that emits blue (B) light, a light-emitting unit that emits green (G) light, and a light-emitting unit that emits blue (B) light in this order.

Alternatively, a light-emitting unit containing one light-emitting substance and a light-emitting unit containing a plurality of light-emitting substances may be used in combination as illustrated in FIG. 23C.

Specifically, in the structure illustrated in FIG. 23C, a plurality of light-emitting units (the light-emitting units 763a, 763b, and 763c) are connected in series with the charge-generation layer 785 provided between each two light-emitting units. The light-emitting unit 763a includes the layer 780a, the light-emitting layer 771, and the layer 790a. The light-emitting unit 763b includes the layer 780b, the light-emitting layer 772a, the light-emitting layer 772b, the light-emitting layer 772c, and the layer 790b. The light-emitting unit 763c includes the layer 780c, the light-emitting layer 773, and the layer 790c.

The structure illustrated in FIG. 23C can be, for example, a three-unit tandem structure of B\R·G$^{SM}$YG\B in which the light-emitting unit 763a is a light-emitting unit that emits blue (B) light, the light-emitting unit 763b is a light-emitting unit that emits red (R), green (G), and yellow-green (YG) light, and the light-emitting unit 763c is a light-emitting unit that emits blue (B) light.

Examples of the stacked structure of light-emitting units include, from an anode side, a two-unit structure of B and Y; a two-unit structure of B and a light-emitting unit X; a three-unit structure of B, Y, and B; and a three-unit structure of B, X, and B. Examples of the stacked structure of light-emitting layers in the light-emitting unit X include, from an anode side, a two-layer structure of R and Y; a two-layer structure of R and G; a two-layer structure of G and R; a three-layer structure of G, R, and G; and a three-layer structure of R, G, and R. Another layer may be provided between two light-emitting layers.

In FIGS. 22C and 22D, the layers 780 and 790 may each have a stacked-layer structure of two or more layers as illustrated in FIG. 22B.

In each of FIGS. 22E and 22F, the light-emitting unit 763a includes the layer 780a, the light-emitting layer 771, and the layer 790a, and the light-emitting unit 763b includes the layer 780b, the light-emitting layer 772, and the layer 790b.

In the case where the lower electrode 761 is an anode and the upper electrode 762 is a cathode, the layers 780a and 780b each include one or more of a hole-injection layer, a hole-transport layer, and an electron-blocking layer. Furthermore, the layers 790a and 790b each include one or more of an electron-injection layer, an electron-transport layer, and a hole-blocking layer. In the case where the lower electrode 761 is a cathode and the upper electrode 762 is an anode, the structures of the layer 780a and the layer 790a are interchanged and the structures of the layer 780b and the layer 790b are interchanged.

In the case where the lower electrode 761 is an anode and the upper electrode 762 is a cathode, the layer 780a includes a hole-injection layer and a hole-transport layer over the hole-injection layer, and may further include an electron-blocking layer over the hole-transport layer, for example. The layer 790a includes an electron-transport layer, and may further include a hole-blocking layer between the light-emitting layer 771 and the electron-transport layer. The layer 780b includes a hole-transport layer, and may further include an electron-blocking layer over the hole-transport layer. The layer 790b includes an electron-transport layer and an electron-injection layer over the electron-transport layer, and may further include a hole-blocking layer between the light-emitting layer 772 and the electron-transport layer. In the case where the lower electrode 761 is a cathode and the upper electrode 762 is an anode, the layer 780a includes an electron-injection layer and an electron-transport layer over the electron-injection layer, and may further include a hole-blocking layer over the electron-transport layer, for example. The layer 790a includes a hole-transport layer, and may further include an electron-blocking layer between the light-emitting layer 771 and the hole-transport layer. The layer 780b includes an electron-transport layer, and may further include a hole-blocking layer over the electron-transport layer. The layer 790b includes a hole-transport layer and a hole-injection layer over the hole-transport layer, and may further include an electron-blocking layer between the light-emitting layer 772 and the hole-transport layer.

In the case of fabricating the light-emitting device with a tandem structure, two light-emitting units are stacked with the charge-generation layer 785 therebetween. The charge-generation layer 785 includes at least a charge-generation region. The charge-generation layer 785 has a function of injecting electrons into one of the two light-emitting units and injecting holes to the other when voltage is applied between the pair of electrodes.

Next, materials that can be used for the light-emitting device will be described.

A conductive film transmitting visible light is used for the electrode through which light is extracted, which is either the lower electrode 761 or the upper electrode 762. A conductive film reflecting visible light is preferably used for the electrode through which light is not extracted. In the case where the display panel includes a light-emitting device emitting infrared light, a conductive film transmitting visible light and infrared light is used for the electrode through which light is extracted, and a conductive film reflecting visible light and infrared light is preferably used for the electrode through which light is not extracted.

A conductive film that transmitting visible light may be used also for the electrode through which light is not extracted. In that case, the electrode is preferably provided between a reflective layer and the EL layer 763. In other words, light emitted from the EL layer 763 may be reflected by the reflective layer to be extracted from the display panel.

As a material for the pair of electrodes of the light-emitting device, a metal, an alloy, an electrically conductive compound, a mixture thereof, or the like can be used as appropriate. Specific examples of the material include metals such as aluminum, titanium, chromium, manganese, iron, cobalt, nickel, copper, gallium, zinc, indium, tin, molybdenum, tantalum, tungsten, palladium, gold, platinum, silver, yttrium, and neodymium, and an alloy containing appropriate combination of any of these metals. Other examples of the material include an indium tin oxide (In—Sn oxide, also referred to as ITO), an In—Si—Sn oxide (also referred to as ITSO), an indium zinc oxide (In—Zn oxide), and an In—W—Zn oxide. Other examples of the material include an alloy containing aluminum (aluminum alloy) such as an alloy of aluminum, nickel, and lanthanum (Al—Ni—La), and an alloy of silver, palladium, and copper (Ag—Pd—Cu, also referred to as APC). Other examples of the material include an element belonging to Group 1 or Group 2 of the periodic table that is not described above (e.g., lithium, cesium, calcium, or strontium), a rare earth metal such as europium or ytterbium, an alloy containing an appropriate combination of any of these elements, and graphene.

The light-emitting device preferably employs a microcavity structure. Therefore, one of the pair of electrodes of the light-emitting device is preferably an electrode having properties of transmitting and reflecting visible light (transflective electrode), and the other is preferably an electrode having a property of reflecting visible light (reflective electrode). When the light-emitting device has a microcavity structure, light obtained from the light-emitting layer can be resonated between the electrodes, whereby light emitted from the light-emitting device can be intensified.

Note that the transflective electrode can have a stacked-layer structure of a conductive layer that can be used as a reflective electrode and a conductive layer that can be used as an electrode having a property of transmitting visible light (also referred to as a transparent electrode).

The transparent electrode has a light transmittance higher than or equal to 40%. For example, an electrode having a visible light (light with wavelengths greater than or equal to 400 nm and less than 750 nm) transmittance higher than or equal to 40% is preferably used in the transparent electrode of the light-emitting device. The transflective electrode has a visible light reflectance higher than or equal to 10% and lower than or equal to 95%, preferably higher than or equal to 30% and lower than or equal to 80%. The reflective electrode has a visible light reflectance higher than or equal to 40% and lower than or equal to 100%, preferably higher than or equal to 70% and lower than or equal to 100%. These electrodes preferably have a resistivity lower than or equal to $1 \times 10^{-2}$ Ωcm.

The light-emitting device includes at least a light-emitting layer. In addition to the light-emitting layer, the light-emitting device may further include a layer containing any of a substance having a high hole-injection property, a substance having a high hole-transport property, a hole-blocking material, a substance having a high electron-transport property, an electron-blocking material, a substance having a high electron-injection property, a substance having a bipolar property (a substance with a high electron- and hole-transport property), and the like. For example, the light-emitting device can include one or more of a hole-injection layer, a hole-transport layer, a hole-blocking layer, a charge-generation layer, an electron-blocking layer, an electron-transport layer, and an electron-injection layer in addition to the light-emitting layer.

Either a low molecular compound or a high molecular compound can be used in the light-emitting device, and an inorganic compound may also be included. Each layer included in the light-emitting device can be formed by any of the following methods: an evaporation method (including a vacuum evaporation method), a transfer method, a printing method, an inkjet method, a coating method, and the like.

The light-emitting layer contains one or more kinds of light-emitting substances. As the light-emitting substance, a substance whose emission color is blue, violet, bluish violet, green, yellowish green, yellow, orange, red, or the like is appropriately used. Alternatively, as the light-emitting substance, a substance that emits near-infrared light can be used.

Examples of the light-emitting substance include a fluorescent material, a phosphorescent material, a TADF material, and a quantum dot material.

Examples of a fluorescent material include a pyrene derivative, an anthracene derivative, a triphenylene derivative, a fluorene derivative, a carbazole derivative, a dibenzothiophene derivative, a dibenzofuran derivative, a dibenzoquinoxaline derivative, a quinoxaline derivative, a pyridine derivative, a pyrimidine derivative, a phenanthrene derivative, and a naphthalene derivative.

Examples of a phosphorescent material include an organometallic complex (particularly an iridium complex) having a 4H-triazole skeleton, a 1H-triazole skeleton, an imidazole skeleton, a pyrimidine skeleton, a pyrazine skeleton, or a pyridine skeleton; an organometallic complex (particularly an iridium complex) having a phenylpyridine derivative including an electron-withdrawing group as a ligand; a platinum complex; and a rare earth metal complex.

The light-emitting layer may contain one or more kinds of organic compounds (e.g., a host material or an assist material) in addition to the light-emitting substance (guest material). As one or more kinds of organic compounds, one or both of a substance having a high hole-transport property (hole-transport material) and a substance having a high electron-transport property (electron-transport material) can be used. As the hole-transport material, a later-described material having a high hole-transport property that can be used for the hole-transport layer can be used. As the electron-transport material, a later-described material having a high electron-transport property that can be used for the electron-transport layer can be used. Alternatively, as one or more kinds of organic compounds, a bipolar material or a TADF material may be used.

The light-emitting layer preferably includes a phosphorescent material and a combination of a hole-transport material and an electron-transport material that easily forms an exciplex, for example. With such a structure, light emission can be efficiently obtained by exciplex-triplet energy transfer (ExTET), which is energy transfer from the exciplex to the light-emitting substance (phosphorescent material). When a combination of materials is selected so as to form an exciplex that emits light whose wavelength overlaps with the wavelength of a lowest-energy-side absorption band of the light-emitting substance, energy can be transferred smoothly and light emission can be obtained efficiently. With the above structure, high efficiency, low-voltage driving, and a long lifetime of a light-emitting device can be achieved at the same time.

The hole-injection layer injects holes from the anode to the hole-transport layer and contains a material having a high hole-injection property. Examples of a material having a high hole-injection property include an aromatic amine compound and a composite material containing a hole-transport material and an acceptor material (electron-accepting material).

As the hole-transport material, a later-described material having a high hole-transport property that can be used for the hole-transport layer can be used.

As the acceptor material, for example, an oxide of a metal belonging to any of Group 4 to Group 8 of the periodic table can be used. Specific examples include molybdenum oxide, vanadium oxide, niobium oxide, tantalum oxide, chromium oxide, tungsten oxide, manganese oxide, and rhenium oxide. Among these, molybdenum oxide is especially preferable since it is stable in the air, has a low hygroscopic property, and is easy to handle. Alternatively, an organic acceptor material containing fluorine can be used. Alternatively, organic acceptor materials such as a quinodimethane derivative, a chloranil derivative, and a hexaazatriphenylene derivative can be used.

As the material having a high hole-injection property, a material containing a hole-transport material and the above-described oxide of a metal belonging to Group 4 to Group 8 of the periodic table (typified by molybdenum oxide) may be used, for example.

The hole-transport layer transports holes injected from the anode by the hole-injection layer, to the light-emitting layer. The hole-transport layer contains a hole-transport material. The hole-transport material preferably has a hole mobility higher than or equal to $1 \times 10^{-6}$ cm$^2$/Vs. Note that other substances can also be used as long as the substances have a hole-transport property higher than an electron-transport property. As the hole-transport material, materials having a high hole-transport property, such as a π-electron rich heteroaromatic compound (e.g., a carbazole derivative, a thiophene derivative, and a furan derivative) and an aromatic amine (a compound having an aromatic amine skeleton), are preferred.

The electron-blocking layer is provided in contact with the light-emitting layer. The electron-blocking layer is a layer having a hole-transport property and containing a material that can block an electron. Among the above-described hole-transport materials, a material having an electron-blocking property can be used for the electron-blocking layer.

Since the electron-blocking layer has a hole-transport property, the electron-blocking layer can also be referred to as a hole-transport layer. Among hole-transport layers, a layer having an electron-blocking property can also be referred to as an electron-blocking layer.

The electron-transport layer transports electrons injected from the cathode by the electron-injection layer, to the light-emitting layer. The electron-transport layer contains an electron-transport material. The electron-transport material preferably has an electron mobility higher than or equal to $1 \times 10^{-6}$ cm$^2$/Vs. Note that other substances can also be used as long as the substances have an electron-transport property higher than a hole-transport property. As the electron-transport material, any of the following materials having a high electron-transport property can be used, for example: a metal complex having a quinoline skeleton, a metal complex having a benzoquinoline skeleton, a metal complex having an oxazole skeleton, a metal complex having a thiazole skeleton, an oxadiazole derivative, a triazole derivative, an imidazole derivative, an oxazole derivative, a thiazole derivative, a phenanthroline derivative, a quinoline derivative having a quinoline ligand, a benzoquinoline derivative, a quinoxaline derivative, a dibenzoquinoxaline derivative, a pyridine derivative, a bipyridine derivative, a pyrimidine derivative, and a π-electron deficient heteroaromatic compound such as a nitrogen-containing heteroaromatic compound.

The hole-blocking layer is provided in contact with the light-emitting layer. The hole-blocking layer is a layer having an electron-transport property and containing a material that can block a hole. Among the above-described electron-transport materials, a material having a hole-blocking property can be used for the hole-blocking layer.

Since the hole-blocking layer has an electron-transport property, the hole-blocking layer can also be referred to as an electron-transport layer. Among electron-transport layers, a layer having a hole-blocking property can also be referred to as a hole-blocking layer.

The electron-injection layer injects electrons from the cathode to the electron-transport layer and contains a material with a high electron-injection property. As the material with a high electron-injection property, an alkali metal, an alkaline earth metal, or a compound thereof can be used. As the material with a high electron-injection property, a composite material containing an electron-transport material and a donor material (electron-donating material) can also be used.

The LUMO level of the material having a high electron-injection property preferably has a small difference (specifically, 0.5 eV or less) from the work function of a material for the cathode.

The electron-injection layer can be formed using an alkali metal, an alkaline earth metal, or a compound thereof, such as lithium, cesium, ytterbium, lithium fluoride (LiF), cesium fluoride (CsF), calcium fluoride ($CaF_x$, where X is a given number), 8-(quinolinolato)lithium (abbreviation: Liq), 2-(2-pyridyl)phenolatolithium (abbreviation: LiPP), 2-(2-pyridyl)-3-pyridinolatolithium (abbreviation: LiPPy), 4-phenyl-2-(2-pyridyl)phenolatolithium (abbreviation: LiPPP), lithium oxide (LiOx), or cesium carbonate, for example. The electron-injection layer may have a stacked-layer structure of two or more layers. As an example of the stacked-layer structure, a structure in which lithium fluoride is used for the first layer and ytterbium is used for the second layer is given.

The electron-injection layer may contain an electron-transport material. For example, a compound having an unshared electron pair and an electron deficient heteroaromatic ring can be used as the electron-transport material. Specifically, it is possible to use a compound having at least one of a pyridine ring, a diazine ring (a pyrimidine ring, a pyrazine ring, or a pyridazine ring), and a triazine ring.

Note that the lowest unoccupied molecular orbital (LUMO) level of the organic compound having an unshared electron pair is preferably greater than or equal to −3.6 eV and less than or equal to −2.3 eV. In general, the highest occupied molecular orbital (HOMO) level and the LUMO level of an organic compound can be estimated by cyclic voltammetry (CV), photoelectron spectroscopy, optical absorption spectroscopy, inverse photoelectron spectroscopy, or the like.

For example, 4,7-diphenyl-1,10-phenanthroline (abbreviation: BPhen), 2,9-di(naphthalen-2-yl)-4,7-diphenyl-1,10-phenanthroline (abbreviation: NBPhen), 2,2'-(1,3-phenylene)bis(9-phenyl-1,10-phenanthroline) (abbreviation: mPPhen2P), diquinoxalino[2,3-a:2',3'-c]phenazine (abbreviation: HATNA), 2,4,6-tris[3'-(pyridin-3-yl)biphenyl-3-yl]-1,3,5-triazine (abbreviation: TmPPPyTz), or the like can be used as the organic compound having an unshared electron pair. Note that NBPhen has a higher glass transition point (Tg) than BPhen and thus has high heat resistance.

As described above, the charge-generation layer includes at least a charge-generation region. The charge-generation region preferably contains an acceptor material. For example, the charge-generation region preferably contains the above-described hole-transport material and acceptor material that can be used for the hole-injection layer.

The charge-generation layer preferably includes a layer containing a material having a high electron-injection property. The layer can also be referred to as an electron-injection buffer layer. The electron-injection buffer layer is preferably provided between the charge-generation region and the electron-transport layer. The electron-injection buffer layer can reduce an injection barrier between the charge-generation region and the electron-transport layer; thus, electrons generated in the charge-generation region can be easily injected into the electron-transport layer.

The electron-injection buffer layer preferably contains an alkali metal or an alkaline earth metal, and can contain an alkali metal compound or an alkaline earth metal compound, for example. Specifically, the electron-injection buffer layer preferably contains an inorganic compound containing an alkali metal and oxygen or an inorganic compound containing an alkaline earth metal and oxygen, and further preferably contains an inorganic compound containing lithium and oxygen (e.g., lithium oxide ($Li_2O$)). Alternatively, a material that can be used for the electron-injection layer can be favorably used for the electron-injection buffer layer.

The charge-generation layer preferably includes a layer containing a material having a high electron-transport property. The layer can also be referred to as an electron-relay layer. The electron-relay layer is preferably provided between the charge-generation region and the electron-injection buffer layer. In the case where the charge-generation layer does not include an electron-injection buffer layer, the electron-relay layer is preferably provided between the charge-generation region and the electron-transport layer. The electron-relay layer has a function of preventing an interaction between the charge-generation region and the electron-injection buffer layer (or the electron-transport layer) and transferring electrons smoothly.

For the electron-relay layer, a phthalocyanine-based material such as copper(II) phthalocyanine (abbreviation: CuPc), or a metal complex having a metal-oxygen bond and an aromatic ligand is preferably used.

Note that the charge-generation region, the electron-injection buffer layer, and the electron-relay layer cannot be clearly distinguished from one another depending on the cross-sectional shape or properties in some cases.

The charge-generation layer may contain a donor material instead of an acceptor material. For example, the charge-generation layer may include a layer containing the above-described electron-transport material and donor material that can be used for the electron-injection layer.

When the charge-generation layer is provided between two light-emitting units to be stacked, an increase in driving voltage can be inhibited.

At least part of any of the structure examples, the drawings corresponding thereto, and the like described in this embodiment can be implemented in combination with any of the other structure examples, the other drawings corresponding thereto, and the like as appropriate.

At least part of this embodiment can be implemented in combination with any of the other embodiments described in this specification, as appropriate.

This application is based on Japanese Patent Application Serial No. 2022-043298 filed with Japan Patent Office on Mar. 18, 2022, the entire contents of which are hereby incorporated by reference.

What is claimed is:

1. An optical device comprising:
   a half mirror;
   a first lens;
   a retardation plate;
   a reflective polarizing plate; and
   a second lens,
   wherein the half mirror, the first lens, the retardation plate, the reflective polarizing plate, and the second lens are placed in this order to have an overlapping region,
   wherein the half mirror and the first lens are placed to be apart from each other,
   wherein the first lens and the retardation plate are placed to be close to each other,
   wherein the first lens is a geometric phase lens,
   wherein the first lens has negative refractive power with respect to circularly polarized light that passes through the half mirror and enters the first lens, and
   wherein a convex surface of the second lens faces an eye of a user.

2. The optical device according to claim 1,
   wherein the first lens comprises a liquid crystal layer, and
   wherein a rotation direction of circularly polarized light that enters the first lens is inverted by birefringence of the liquid crystal layer and then the circularly polarized light is emitted.

3. The optical device according to claim 2,
   wherein the first lens has one of negative refractive power and positive refractive power with respect to circularly polarized light that enters from a first surface of the liquid crystal layer,
   wherein the first lens has the other of the negative refractive power and the positive refractive power with respect to circularly polarized light that enters from a second surface, and
   wherein the second surface is opposite to the first surface.

4. The optical device according to claim 1,
   wherein the half mirror comprises a concave surface on the first lens side, and
   wherein a reflection surface is provided on the concave surface.

5. The optical device according to claim 4, wherein the half mirror has a shape of a concave lens.

6. The optical device according to claim 1, wherein the retardation plate is a quarter-wave plate.

7. The optical device according to claim 1, wherein the reflective polarizing plate reflects first linearly polarized light, and transmits second linearly polarized light that is orthogonal to the first linearly polarized light.

8. The optical device according to claim 1, wherein the second lens is a convex lens.

9. The optical device according to claim 1, wherein a circular polarizing plate is provided on a surface of the half mirror opposite to a surface of the half mirror on which the first lens is provided.

10. An electronic device comprising:
    a housing;
    two sets of a display device and the optical device according to claim 1, in the housing; and
    a band for mounting the housing on a head.

11. The electronic device according to claim 10, wherein the display device comprises an organic EL device.

12. The optical device according to claim 1, wherein the second lens is a plano- convex lens.

* * * * *